(12) United States Patent
Ando et al.

(10) Patent No.: US 10,714,264 B2
(45) Date of Patent: Jul. 14, 2020

(54) ELECTRONIC DEVICE

(71) Applicant: TDK CORPORATION, Tokyo (JP)

(72) Inventors: Norihisa Ando, Tokyo (JP); Sunao Masuda, Tokyo (JP); Masahiro Mori, Tokyo (JP); Kayou Matsunaga, Tokyo (JP); Kosuke Yazawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/165,619

(22) Filed: Oct. 19, 2018

(65) Prior Publication Data

US 2019/0157010 A1    May 23, 2019

(30) Foreign Application Priority Data

Nov. 21, 2017  (JP) ................ 2017-223907

(51) Int. Cl.
| | |
|---|---|
| *H01G 4/38* | (2006.01) |
| *H01G 2/06* | (2006.01) |
| *H01R 4/48* | (2006.01) |
| *H01R 12/57* | (2011.01) |
| *H01R 4/02* | (2006.01) |
| *H01G 4/248* | (2006.01) |

(Continued)

(52) U.S. Cl.
CPC ............ *H01G 4/38* (2013.01); *H01G 2/04* (2013.01); *H01G 2/065* (2013.01); *H01G 4/224* (2013.01); *H01G 4/232* (2013.01); *H01G 4/248* (2013.01); *H01R 4/02* (2013.01); *H01R 4/04* (2013.01); *H01R 4/48* (2013.01); *H01R 12/57* (2013.01); *H01G 4/1227* (2013.01); *H01G 4/30* (2013.01)

(58) Field of Classification Search
None
See application file for complete search history.

(56) References Cited

U.S. PATENT DOCUMENTS

| 6,288,887 B1 | 9/2001 | Yoshida et al. |
|---|---|---|
| 6,433,992 B2 | 8/2002 | Nakagawa et al. |

(Continued)

FOREIGN PATENT DOCUMENTS

| CN | 103632844 A | 3/2014 |
|---|---|---|
| CN | 104637683 A | 5/2015 |

(Continued)

OTHER PUBLICATIONS

Jan. 7, 2019 Office Action issued U.S. Appl. No. 15/819,804.

(Continued)

*Primary Examiner* — Dion Ferguson
(74) *Attorney, Agent, or Firm* — Oliff PLC

(57) ABSTRACT

A metal terminal is connectable to terminal electrodes of chip components arranged side by side. The metal terminal includes units corresponding to each chip. Each unit includes an electrode facing portion, a pair of upper and lower holding portions, a mount portion, and protrusions. The electrode facing portion faces the electrode of the chip. The pair of upper and lower holding portions holds the chip. The mount portion is located below the lower holding portion of the electrode facing portion. The protrusions protrude from the electrode facing portion toward the electrode. The protrusions in each unit are arranged substantially line-symmetrically to a virtual center line passing through a middle point between the upper and lower holding portions.

15 Claims, 17 Drawing Sheets

(51) Int. Cl.
  *H01G 4/224* (2006.01)
  *H01R 4/04* (2006.01)
  *H01G 2/04* (2006.01)
  *H01G 4/232* (2006.01)
  *H01G 4/30* (2006.01)
  *H01G 4/12* (2006.01)

(56) References Cited

U.S. PATENT DOCUMENTS

| | | | |
|---|---|---|---|
| 7,331,799 B1 | 2/2008 | Lee | |
| 8,570,708 B2* | 10/2013 | Itagaki | H01G 4/30 361/301.4 |
| 2004/0183147 A1 | 9/2004 | Togashi et al. | |
| 2009/0147440 A1 | 6/2009 | Cygan et al. | |
| 2014/0055910 A1* | 2/2014 | Masuda | H01G 4/01 361/303 |
| 2015/0114697 A1 | 4/2015 | Murrell et al. | |
| 2015/0131202 A1* | 5/2015 | Masuda | H01G 4/38 361/301.4 |
| 2015/0187495 A1 | 7/2015 | Maeda et al. | |
| 2017/0287645 A1* | 10/2017 | Masuda | H01G 4/005 |
| 2018/0033556 A1* | 2/2018 | Itamochi | H01C 7/008 |
| 2018/0197681 A1 | 7/2018 | Ando et al. | |
| 2018/0211784 A1 | 7/2018 | Ando et al. | |

FOREIGN PATENT DOCUMENTS

| | | |
|---|---|---|
| JP | 2000-235932 A | 8/2000 |
| JP | 2015-095490 A | 5/2015 |

OTHER PUBLICATIONS

Mar. 21, 2019 Office Action issued in U.S. Appl. No. 15/819,778.
Oct. 2, 2019 Office Action issued in U.S. Appl. No. 15/819,804.
Oct. 4, 2018 Office Action issued in U.S. Appl. No. 15/819,804.
Sep. 26, 2018 Office Action issued in U.S. Appl. No. 15/819,778.
U.S. Appl. No. 15/819,804, filed Nov. 21, 2017 in the name of Ando et al.
U.S. Appl. No. 15/819,778, filed Nov. 21, 2017 in the name of Ando et al.
U.S. Appl. No. 16/452,042, filed Jun. 25, 2019 in the name of Ando et al.

* cited by examiner

ELECTRONIC DEVICE

BACKGROUND OF THE INVENTION

The present invention relates to a metal terminal and an electronic device attached with the metal terminal.

In addition to a normal chip component that is solely directly mounted on a board, as shown in Patent Document 1 for example, a chip component attached with a metal terminal is proposed as an electronic device, such as a ceramic capacitor.

It is reported that the electronic device attached with a metal terminal after being mounted has a reduction effect on a deformation stress that travels from a board to a chip component and a protection effect on a chip component from impacts or so. Thus, the electronic device attached with a metal terminal is used in a field where durability, reliability, and the like are required.

In conventional electronic devices with a metal terminal, however, a terminal electrode of a chip component and a metal terminal are joined by only a solder, and there is a problem with the joint. For example, the soldering operation needs to be conducted while the terminal electrode of the chip component and the metal terminal are being positioned. In particular, when a plurality of chip components is soldered to a pair of metal terminals, this operation is complicated, and the joint reliability may decrease.

Patent Document 1: JP2000235932 (A)

BRIEF SUMMARY OF INVENTION

The present invention has been achieved under such circumstances. It is an object of the invention to provide a metal terminal capable of stably, easily, and securely connecting a plurality of chip components and excellent in a prevention effect on acoustic noise, and to provide an electronic device having the metal terminal.

To achieve the above object, the metal terminal according to the first aspect of the present invention is a metal terminal connectable to terminal electrodes respectively formed on ends of a second axis direction of a plurality of chip components arranged side by side in a first axis direction, comprising units corresponding to the chip components, respectively, wherein each of the units comprises:

an electrode facing portion facing the terminal electrode of the chip component;

a pair of upper holding portion and lower holding portion configured to hold the chip component in a third axis direction substantially perpendicular to the first and second axis directions;

a mount portion located below the lower holding portion of the electrode facing portion in the third axis direction; and protrusions protruding from the electrode facing portion toward the terminal electrode, and wherein the protrusions in each of the units are arranged substantially line-symmetrically to a virtual center line in the first axis direction passing through a middle point between the upper holding portion and the lower holding portion in the third axis direction.

The metal terminal according to the first aspect of the present invention can hold the plurality of chip components arranged side by side in the first axis direction parallel to a mount surface. In addition, the metal terminal according to the first aspect of the present invention includes the units corresponding to the respective chip components, and each of the units includes the electrode facing portion facing the terminal electrode of the chip component and the pair of upper arm portion and lower arm portion holding the chip component from both of the upper and lower ends of the chip component.

Thus, if the metal terminal according to the first aspect of the present invention is used, the plurality of chip components can be soldered to the metal terminal while the chip components are being held by the upper arm portion and the lower arm portion, and the metal terminal and the chip components are thereby joined more securely and stably. Incidentally, even if the metal terminal and the chip components are joined using a connection member, such as conductive adhesive, instead of solder, the metal terminal and the chip components are also joined more securely and stably.

In the metal terminal according to the first aspect of the present invention, each of the units includes the protrusions protruding from the electrode facing portion toward the terminal electrode, and the protrusions are arranged line-symmetrically to the virtual center line in each of the units. Thus, the protrusions can uniformly control a thickness of solder, conductive adhesive, etc. to be placed between the metal terminal and the terminal electrode of the chip component. Thus, the connection strength between the metal terminal and each chip component is improved uniformly.

The metal terminal according to the first aspect of the present embodiment includes the mount portion below the lower arm portion in each of the units corresponding to each chip component. Thus, electric passages from the terminal electrode of each chip component to a circuit board or so via the electrode facing portion and the mount portion have the same length, and electronic characteristics, such as ESR, of the chip components can be uniform.

In the metal terminal according to the first aspect of the present embodiment, the units can have substantially the same holding structure of the metal terminal from the terminal electrode of each chip component held in each of the units of the metal terminal to the circuit board connected with the mount portion. Thus, the units can have a common structure where vibrations of each chip component are hard to travel to the circuit board, and a so-called acoustic noise phenomenon is easily prevented.

Moreover, there is no need to provide a protrusion that divides the chip components between the units adjacent to each other of the metal terminal according to the first aspect of the present embodiment. Thus, the plurality of chip components can be stably and easily attached to the metal terminal even if the chip components connected by the metal terminal have slightly varied lengths in the first axis direction. Incidentally, the variation of the chip components in height in the third axis direction can be absorbed by elastic deformation with the upper arm portion and the lower arm portion, and even in this case, the plurality of chip components can stably and easily be attached to the metal terminal.

If the number of chip components to be connected with the metal terminal is desired to increase, the metal terminal should be designed so that the number of units having the same structure to be provided in the metal terminal increases, and it is easy to increase and decrease the number of chip components to be attached to the metal terminal.

Preferably, a first through hole going through front and back surfaces of the electrode facing portion is formed at the middle point in each of the units. When the first through hole is provided in each unit, an application state of the connection member, such as solder, can be observed from outside via the first through hole. Moreover, bubbles contained in the connection member, such as solder, can be released via the first through holes. This stabilizes the joint even if the amount of the connection member, such as solder, is small.

The metal terminal according to the second aspect of the present invention is a metal terminal connectable to terminal electrodes respectively formed on ends of a second axis direction of a plurality of chip components arranged side by side in a first axis direction, comprising units corresponding to the chip components, respectively, wherein each of the units comprises:

an electrode facing portion facing the terminal electrode of the chip component;

a pair of upper holding portion and lower holding portion configured to hold the chip component in a third axis direction substantially perpendicular to the first and second axis directions; and a mount portion located below the lower holding portion of the electrode facing portion in the third axis direction, and wherein a first through hole going through front and back surfaces of the electrode facing portion is formed at a middle point between the upper holding portion and the lower holding portion in the third axis direction in each of the units.

The metal terminal according to the second aspect of the present invention demonstrates similar effects to the metal terminal according to the first aspect of the present invention except for the following effects. In the second aspect of the present invention, the first through hole going through front and back surfaces of the electrode facing portion is formed at a middle point between the upper holding portion and the lower holding portion in the third axis direction in each of the units. Since the first through hole is provided in each of the units, an application state of the connection member, such as solder, can be observed from outside via the first through hole. Moreover, bubbles contained in the connection member, such as solder, can be released via the first through holes. This stabilizes the joint even if the amount of the connection member, such as solder, is small.

Preferably, the lower holding portion is formed to be bent from a lower edge of the third axis direction of a second through hole formed on the electrode facing portion. In this structure, the second through hole and the lower holding portion can be formed easily simultaneously. The second through hole and the lower holding portion are arranged closely, and vibrations of the chip components can more effectively be prevented from traveling to the metal terminal.

In the second through hole, vibrations do not travel from the chip component to the metal terminal. Vibrations are easily generated by electrostrictive phenomenon particularly in a part where the internal electrodes of the chip component are laminated via the dielectric layers, but vibrations can effectively be prevented from traveling in a part where the second through hole is formed. Thus, acoustic phenomenon can effectively be prevented.

Moreover, since the lower holding portion is formed to be bent from the lower edge of the second through hole, the lower holding portion, which has an excellent elasticity, can receive the weight of each chip component. In this regard, vibrations of the chip components are hard to travel to the metal terminal, and acoustic phenomenon can effectively be prevented.

Preferably, the electrode facing portions of the units are continuously formed by a plate member in the first axis direction. In this structure, the metal terminal can easily be manufactured.

The electronic device according to the first aspect of the present invention comprises either of the above-mentioned metal terminals.

The electronic device according to the second aspect of the present invention is an electronic device comprising a metal terminal connected to terminal electrodes respectively formed on ends of a second axis direction of a plurality of chip components arranged side by side in a first axis direction, wherein the metal terminal comprises units corresponding to the chip components, respectively, wherein each of the units comprises:

an electrode facing portion facing the terminal electrode of the chip component;

a pair of upper holding portion and lower holding portion configured to hold the chip component in a third axis direction substantially perpendicular to the first and second axis directions;

a mount portion located below the lower holding portion of the electrode facing portion in the third axis direction; and protrusions protruding from the electrode facing portion toward the terminal electrode, and wherein a central part of the terminal electrode is positioned between the protrusions in the third axis direction in each of the units.

Preferably, the central part of the terminal electrode in each of the units is positioned on a virtual center line in the first axis direction passing through a middle point between the upper holding portion and the lower holding portion in the third axis direction.

The electronic device according to the third aspect of the present invention is an electronic device comprising a metal terminal connected to terminal electrodes respectively formed on ends of a second axis direction of a plurality of chip components arranged side by side in a first axis direction, wherein the metal terminal comprises units corresponding to the chip components, respectively, wherein each of the units comprises:

an electrode facing portion facing the terminal electrode of the chip component;

a pair of upper holding portion and lower holding portion configured to hold the chip component in a third axis direction substantially perpendicular to the first and second axis directions; and a mount portion located below the lower holding portion of the electrode facing portion in the third axis direction;

wherein a first through hole going through front and back surfaces of the electrode facing portion is formed between the upper holding portion and the lower holding portion in each of the units, and wherein a central part of the terminal electrode is positioned within the first through hole.

The electronic device according to the fourth aspect of the present invention is an electronic device comprising a metal terminal connected to terminal electrodes respectively formed on ends of a second axis direction of a plurality of chip components arranged side by side in a first axis direction, wherein the metal terminal comprises units corresponding to the chip components, respectively, wherein each of the units comprises:

an electrode facing portion facing the terminal electrode of the chip component;

a pair of upper holding portion and lower holding portion configured to hold the chip component in a third axis direction substantially perpendicular to the first and second axis directions;

a mount portion located below the lower holding portion of the electrode facing portion in the third axis direction; and protrusions protruding from the electrode facing portion toward the terminal electrode, wherein a joint region exists between the protrusions in the third axis direction in each of the units, and wherein the terminal electrode and the electrode facing portion are joined by a connection member in the joint region.

Preferably, non-joint regions exist on both sides of the joint region in the third axis direction, and the connection member does not exist in the non-joint regions between the electrode facing portion and the end surface of the terminal electrode.

The electronic device according to the fifth aspect of the present invention is an electronic device comprising a metal terminal connected to terminal electrodes respectively formed on ends of a second axis direction of a plurality of chip components arranged side by side in a first axis direction, wherein the metal terminal comprises units corresponding to the chip components, respectively, wherein each of the units comprises:

an electrode facing portion facing the terminal electrode of the chip component;

a pair of upper holding portion and lower holding portion configured to hold the chip component in a third axis direction substantially perpendicular to the first and second axis directions; and a mount portion located below the lower holding portion of the electrode facing portion in the third axis direction, and wherein a first through hole going through front and back surfaces of the electrode facing portion is formed in each of the units and is surrounded by a joint region where the terminal electrode and the electrode facing portion are joined by a connection member.

DETAILED DESCRIPTION OF INVENTION

Hereinafter, the present invention is described based on embodiments shown in the figures.

First Embodiment

Figure 1A:
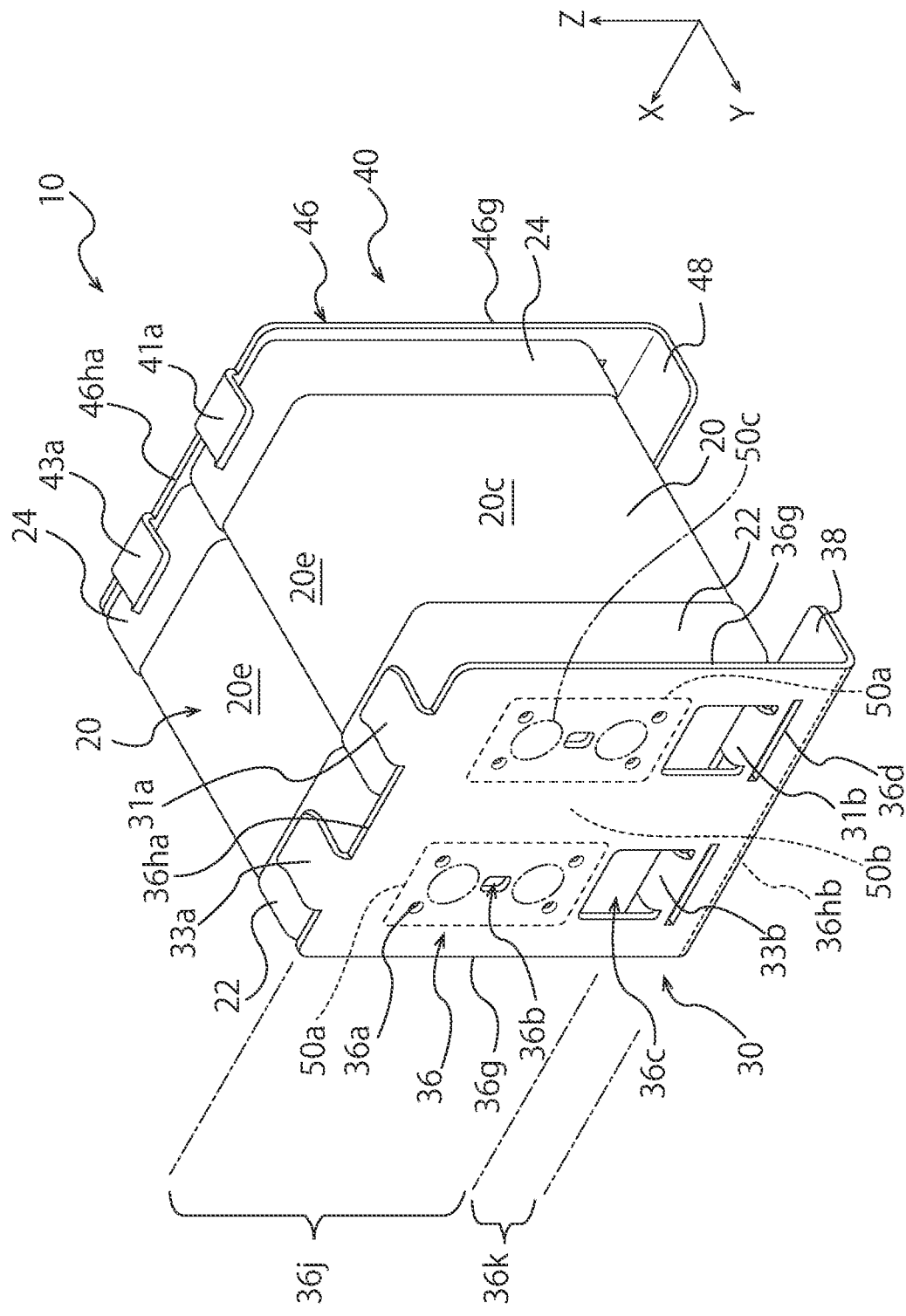
FIG. 1A is a schematic perspective view illustrating a ceramic electronic device having metal terminals according to an embodiment of the present invention.

FIG. 1A is a schematic perspective view illustrating a capacitor 10 as an electronic device having metal terminals according to First Embodiment of the present invention. The capacitor 10 has capacitor chips 20 as chip components and a pair of metal terminals 30 and 40. The capacitor 10 according to First Embodiment has two capacitor chips 20, but the capacitor 10 may have any plural capacitor chips 20.

Incidentally, each embodiment is described with a capacitor where the capacitor chips 20 are equipped with the metal terminals 30 and 40, but the ceramic electronic device of the present invention is not limited to this capacitor, and may be a chip component other than capacitors equipped with the metal terminals 30 and 40.

In the figures, the X-axis, the Y-axis, and the Z-axis are perpendicular to each other, the X-axis (first axis) is parallel to a direction where the capacitor chips 20 are arranged as shown in FIG. 1A, the Z-axis (third axis) corresponds with a height direction of the capacitor 10 from a mount surface, and the Y-axis (second axis) corresponds with a direction where a pair of terminal electrodes 22 and 24 of the chip 20 is mutually arranged on the opposite side.

Figure 2A:
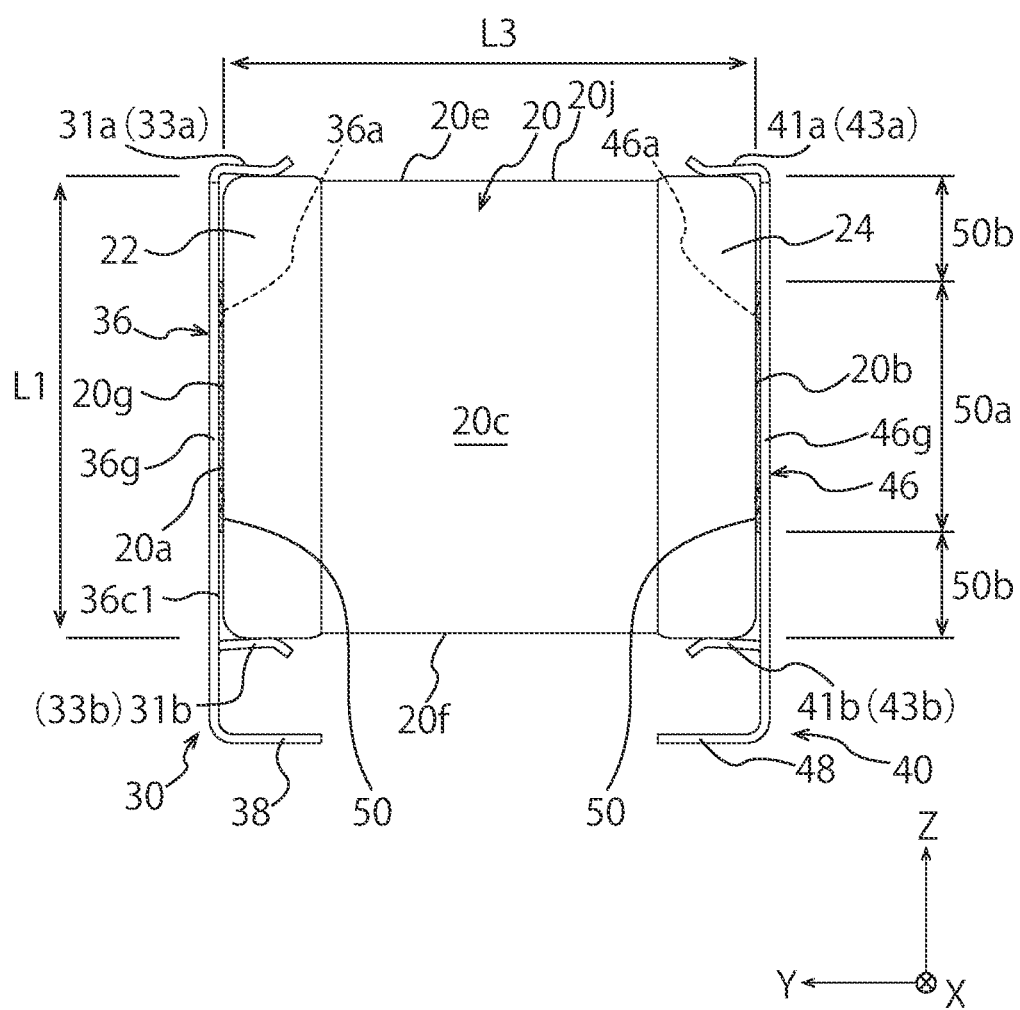
FIG. 2A is a front view of the ceramic electronic device shown in FIG. 1A.
Figure 2B:
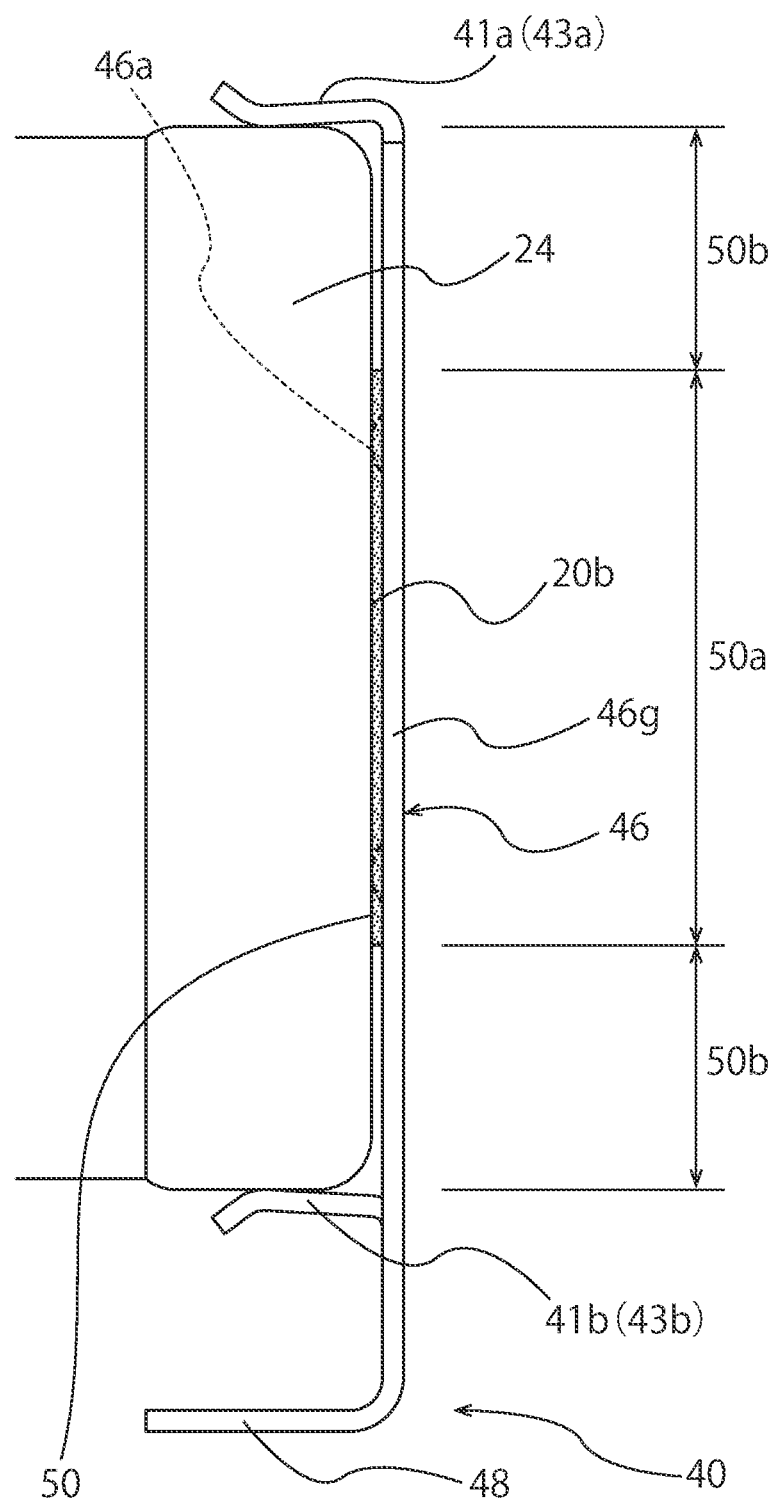
FIG. 2B is an enlarged front view of a main part illustrating the detail of a connection part between the metal terminal and a terminal electrode shown in FIG. 1A.

The capacitor chips 20 have an approximately rectangular parallelepiped shape, and each of the two capacitor chips 20 has approximately the same shape and size. As shown in FIG. 2A, the capacitor chips 20 have a pair of chip end surfaces facing each other, and the pair of chip end surfaces consists of a first end surface 20a and a second end surface 20b. As shown in FIG. 1A, FIG. 2A, and FIG. 4, the first and second end surfaces 20a and 20b have an approximately rectangular shape. In four sides constituting each rectangle of the first and second end surfaces 20a and 20b, a pair of longer sides is chip first sides 20g (see FIG. 2A), and a pair of shorter sides is chip second sides 20h (see FIG. 3A).

The capacitor chips 20 are arranged so that the first end surfaces 20a and the second end surfaces 20b are perpendicular to a mount surface, in other words, the chip third sides 20j of the capacitor chips 20 connecting between the first end surfaces 20a and the second end surfaces 20b are parallel to the mount surface of the capacitor 10. Incidentally, the mount surface of the capacitor 10 is a surface attached with the capacitor 10 by solder or so and facing mount portions 38 and 48 of the metal terminals 30 and 40 mentioned below, and is a parallel surface to the X-Y plane shown in FIG. 1A.

When comparing a length L1 of the chip first sides 20g shown in FIG. 2A and a length L2 of the chip second sides 20h shown in FIG. 4, the chip second sides 20h are shorter than the chip first sides 20g (L1>L2). The chip first sides 20g and the chip second sides 20h have any length ratio, but L2/L1 is about 0.3 to 0.7, for example.

The capacitor chips 20 are arranged so that the chip first sides 20g are perpendicular to the mount surface as shown in FIG. 2A, and that the chip second sides 20h are parallel to the mount surface as shown in FIG. 4. In the first to fourth side surfaces 20c to 20f, which are the four chip side surfaces connecting the first end surfaces 20a and the second end surfaces 20b, the first and second side surfaces 20c and 20d have large areas and are arranged perpendicularly to the mount surface, and the third and fourth side surfaces 20e and 20f have areas that are smaller than those of the first and second side surfaces 20c and 20d and are arranged in parallel to the mount surface. The third side surfaces 20e are upper side surfaces facing the opposite direction to the mount portions 38 and 48 below, and the fourth sides surfaces 20f are lower side surfaces facing the mount portions 38 and 48.

As shown in FIG. 1A, FIG. 2A, and FIG. 4, the first terminal electrodes 22 of the capacitor chips 20 are formed to reach from the first end surfaces 20a to a part of the first to fourth side surfaces 20c to 20f. Thus, each of the first terminal electrodes 22 has a part arranged on the first end surface 20a and a part arranged on the first to fourth side surfaces 20c and 20f.

The second terminal electrodes 24 of the capacitor chips 20 are formed to reach from the second end surfaces 20b to another part of the first to fourth side surfaces 20c to 20f (a different part from the part where the first terminal electrodes 22 reach). Thus, each of the second terminal electrodes 24 has a part arranged on the second end surface 20b and a part arranged on the first to fourth side surfaces 20c to 20f (see FIG. 1A, FIG. 2A, and FIG. 4). The first terminal electrodes 22 and the second terminal electrodes 24 are arranged with a predetermined distance on the first to fourth side surfaces 20c to 20f.

Figure 6:
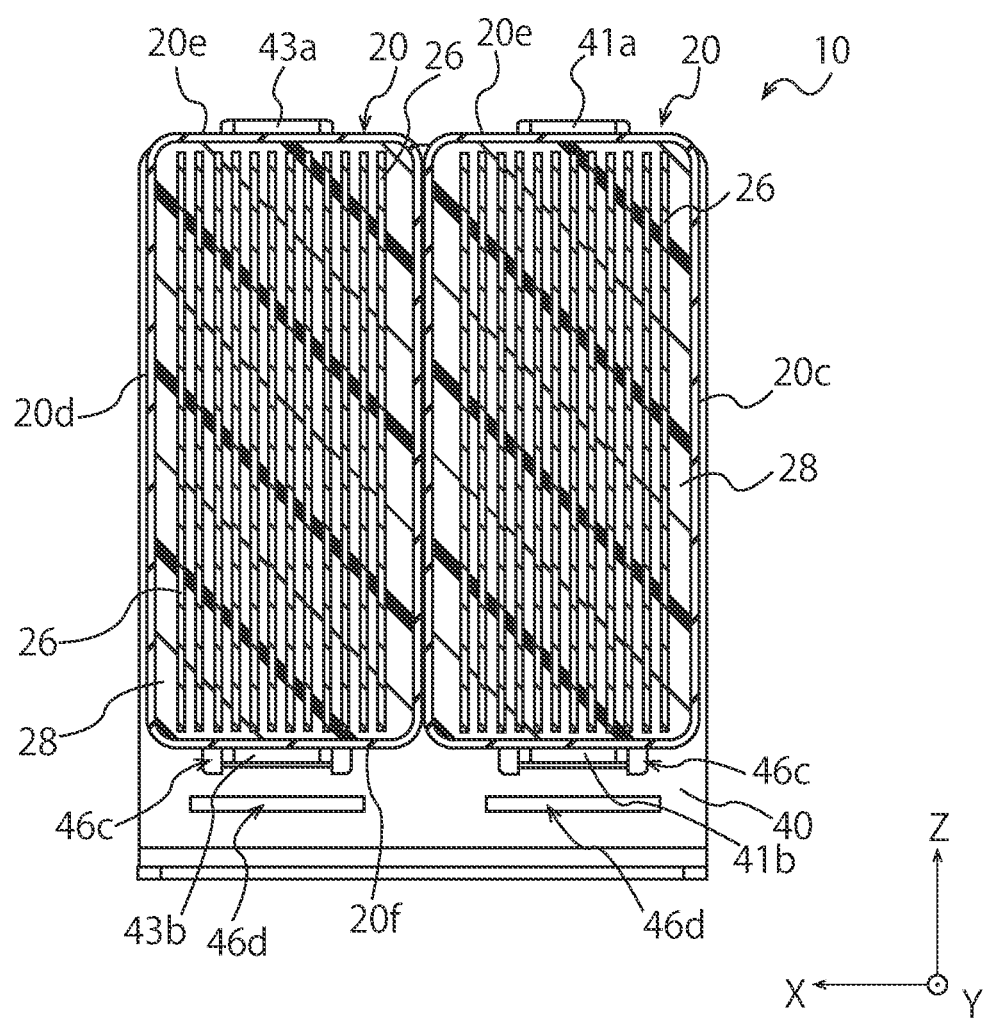
FIG. 6 is a cross-sectional view perpendicular to the Y-axis of the ceramic electronic device shown in FIG. 1A.

As shown in FIG. 6, which schematically illustrates an internal structure of the capacitor chips 20, the capacitor chips 20 are a multilayer capacitor where internal electrode layers 26 and dielectric layers 28 are laminated. In the internal electrode layers 26, internal electrode layers 26 connected with the first terminal electrodes 22 and internal electrode layers 26 connected with the second terminal electrodes 24 are laminated alternately by sandwiching the dielectric layers 28.

As shown in FIG. 6, the internal electrode layers 26 of the capacitor chips 20 have a lamination direction that is parallel to the X-axis and perpendicular to the Y-axis. That is, the internal electrode layers 26 shown in FIG. 6 are arranged in parallel to the plane of the Z-axis and the Y-axis and perpendicularly to the mount surface.

The dielectric layers 28 of the capacitor chips 20 are composed of any dielectric material, such as calcium titanate, strontium titanate, barium titanate, and a mixture thereof. Each of the dielectric layers 28 has any thickness, but normally has a thickness of several μm to several hundred μm. In the present embodiment, each of the dielectric layers 28 has a thickness of 1.0 to 5.0 μm, for example.

The dielectric layers 28 preferably have a main component of barium titanate, which can increase capacitance of capacitors.

The internal electrode layers 26 contain any conductive material, but may contain a comparatively inexpensive base metal when the dielectric layers 28 are composed of a reduction resistant material. The base metal is preferably Ni or a Ni alloy. The Ni alloy is preferably an alloy of Ni and one or more elements of Mn, Cr, Co, and Al, and preferably contains Ni at 95 wt % or more. Incidentally, Ni or the Ni alloy may contain various fine components, such as P, at about 0.1 wt % or less. The internal electrode layers 26 may be formed using a commercially available electrode paste. Each of the internal electrode layers 26 has a thickness appropriately determined based on usage or so.

The first and second terminal electrodes 22 and 24 are also composed of any material. The first and second terminal electrodes 22 and 24 are normally composed of copper, copper alloy, nickel, nickel alloy, or the like, but may be composed of silver, an alloy of silver and palladium, or the like. Each of the first and second terminal electrodes 22 and 24 also has any thickness, but normally has a thickness of about 10 to 50 μm. Incidentally, at least one metal film of Ni, Cu, Sn, etc. may be formed on the surfaces of the first and second terminal electrodes 22 and 24.

The capacitor chips 20 have shape and size that are appropriately determined based on object and usage. For example, each of the capacitor chips 20 has a length (L3 shown in FIG. 2A) of 1.0 to 6.5 mm, preferably 3.2 to 5.9 mm, a width (L1 shown in FIG. 2A) of 0.5 to 5.5 mm, preferably 1.6 to 5.2 mm, and a thickness (L2 shown in FIG. 4) of 0.3 to 3.5 mm, preferably 0.8 to 3.2 mm. A plurality of capacitor chips 20 attached to the pair of metal terminals 30 and 40 may have mutually different size and shape.

The pair of metal terminals 30 and 40 of the capacitor 10 is arranged correspondingly with the first and second end surfaces 20a and 20b, which are a pair of chip end surfaces. That is, the first metal terminal 30, which is one of the pair of metal terminals 30 and 40, is arranged correspondingly with the first terminal electrodes 22, which are one of the pair of terminal electrodes 22 and 24, and the second metal terminal 40, which is the other of the pair of metal terminals 30 and 40, is arranged correspondingly with the second terminal electrodes 24, which are the other of the pair of terminal electrodes 22 and 24.

The first metal terminal 30 has an electrode facing portion 36 with a plate shape, a plurality of pairs of engagement arm portions (top and bottom holding portions) 31a, 31b, 33a, and 33b, and a mount portion 38. The electrode facing portion 36 faces the first terminal electrodes 22. The engagement arm portions 31a, 31b, 33a, and 33b sandwich and hold the capacitor chips 20 from both ends of the chip first sides 20g in the Z-axis direction. The mount portion 38 extends from the electrode facing portion 36 toward the capacitor chips 20 and is at least partially approximately perpendicular to the electrode facing portion 36.

Figure 3A:
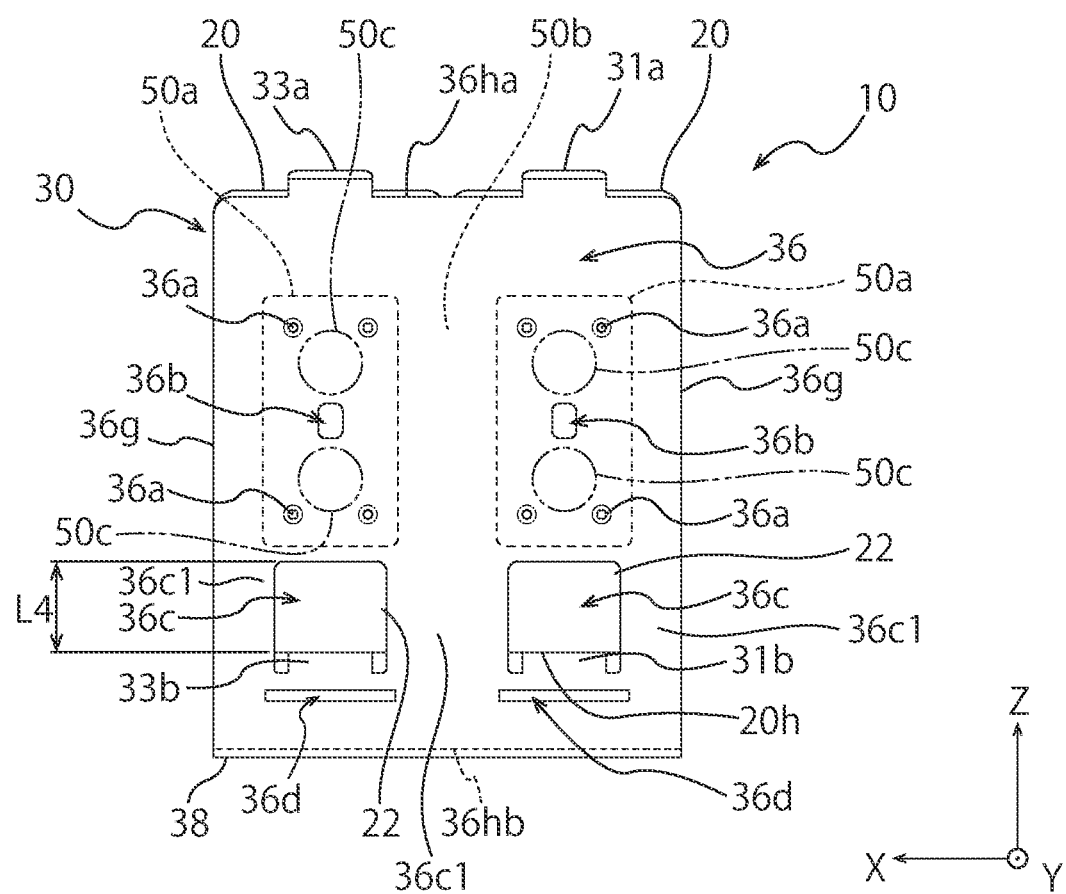
FIG. 3A is a left-side view of the ceramic electronic device shown in FIG. 1A.
Figure 4:
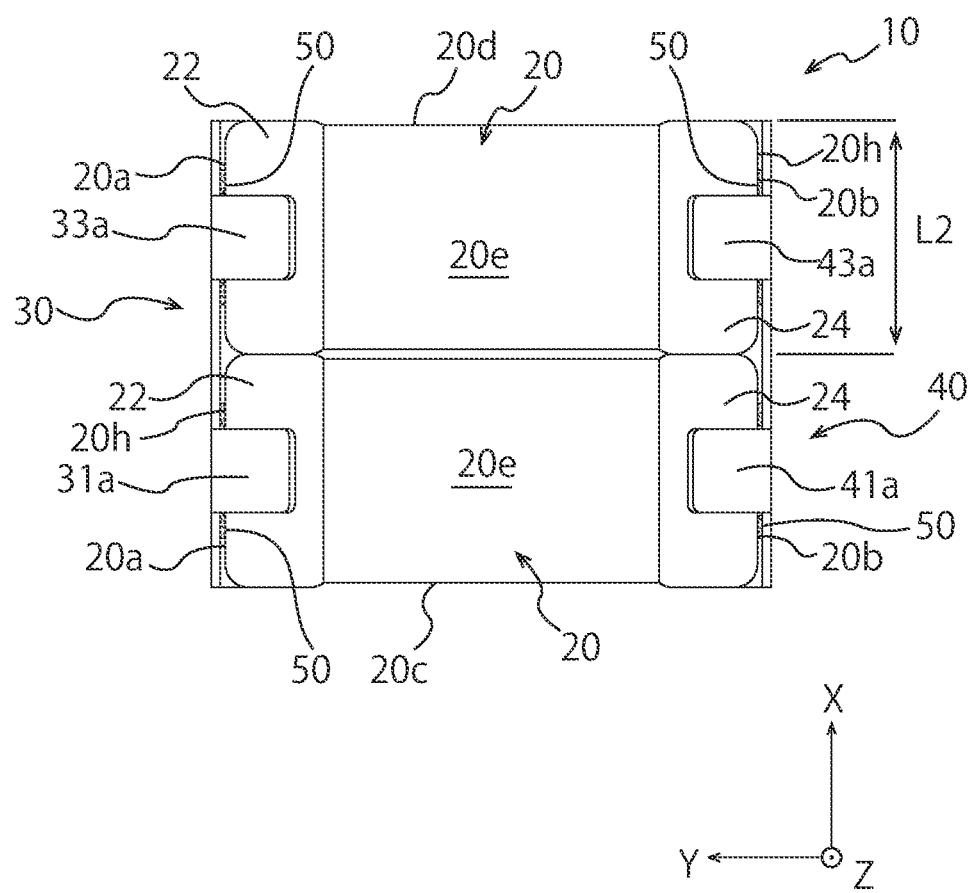
FIG. 4 is a top view of the ceramic electronic device shown in FIG. 1A.

As shown in FIG. 2A, the electrode facing portion 36 has a substantially rectangular flat shape having a pair of terminal first sides 36g approximately parallel to the chip first sides 20g perpendicular to the mount surface and a pair of terminal second sides 36ha and 36hb approximately parallel to the chip second sides 20h parallel to the mount surface as shown in FIG. 3A.

Figure 3B:
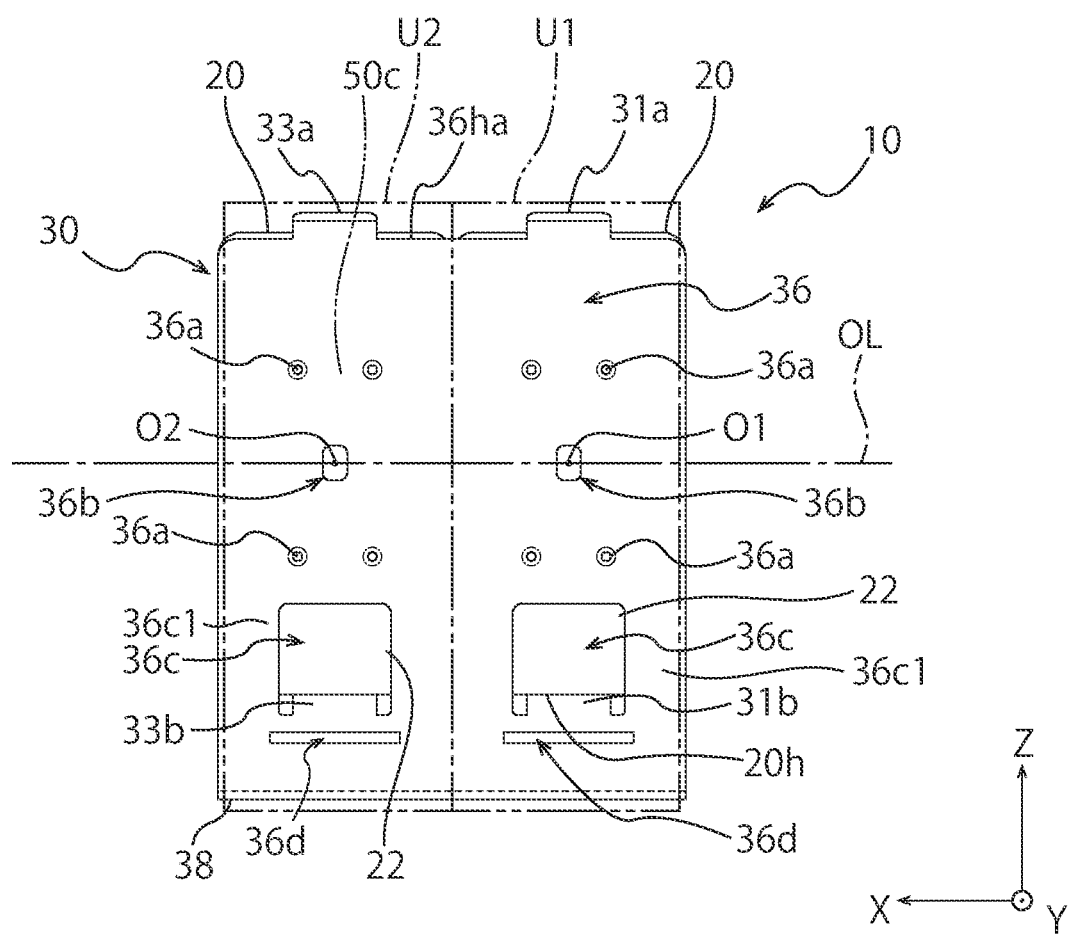
FIG. 3B is a left-side view illustrating that the metal terminal shown in FIG. 3A has a plurality of repeat units.
Figure 3C:
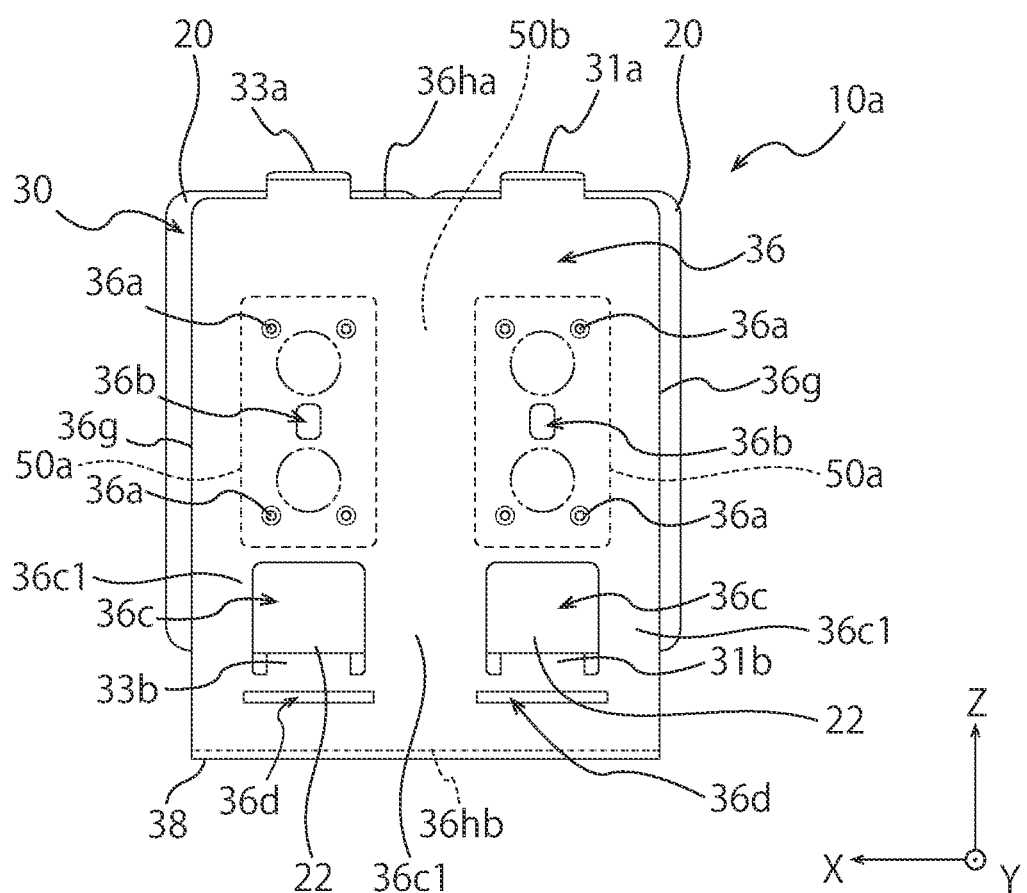
FIG. 3C is a left-side view of a ceramic electronic device having a metal terminal according to a variation of the embodiment shown in FIG. 3A.

As shown in FIG. 3A and FIG. 3C (First Variation), the terminal second sides 36ha and 36hb parallel to the mount surface have a length that is several times plus or minus alpha of a length L2 (see FIG. 4) of the chip second sides 20h arranged in parallel to the terminal second sides 36ha and 36hb. That is, the electrode facing portion 36 has a width in the X-axis that may be equal to, slightly shorter, or slightly longer than a length obtained by multiplying the number and X-axis width of each capacitor chip 20 contained in the capacitor 10 shown in FIG. 3A or a capacitor 10a shown in FIG. 3C.

For example, the capacitor 10a according to First Variation shown in FIG. 3C includes two capacitor chips 20, and terminal second sides 36ha and 36hb parallel to a mount surface have a length that is shorter than a double of a length L2 of a chip second side 20h arranged in parallel to the terminal second sides 36ha and 36hb. Incidentally, the capacitor 10a is the same as the capacitor 10 shown in FIG. 1A to FIG. 6 except that the chip second sides of the capacitor chips 20 have a length that is longer than a length of the chip second sides 20h of the capacitor chips 20 according to the embodiment.

On the other hand, the capacitor 10 according to First Embodiment shown in FIG. 3A includes two capacitor chips 20, and the terminal second sides 36ha and 36hb parallel to the mount surface have a length that is the same as or slightly longer than a double of a length L2 of the chip second side 20h arranged in parallel to the terminal second sides 36ha and 36hb. As shown in FIG. 3A, a capacitor chip that can be combined with the metal terminals 30 and 40 does not have only one size, and the metal terminals 30 and 40 can constitute an electronic device correspondingly with multiple kinds of capacitor chips 20 having different lengths in the X-axis direction.

The electrode facing portion 36 is electrically and mechanically connected with the first terminal electrodes 22 formed on the first end surfaces 20a facing the electrode facing portion 36. For example, the electrode facing portion 46 and the second terminal electrodes 24 can be connected with each other by arranging a conductive connection member 50, such as solder and conductive adhesive, in a space between the electrode facing portion 46 and the second terminal electrodes 24 shown in FIG. 2B. This is also the case with the space between the electrode facing portion 36 and the first terminal electrode 22 shown in FIG. 2A.

Joint regions 50a are determined as a region where the connection member 50 joins the electrode facing portion 36 and the end surfaces of the first terminal electrodes 22. A non-joint region 50b is determined as a region where the electrode facing portion 36 and the end surfaces of the first terminal electrodes 22 are not joined without the connection member 50, and a space exists between the electrode facing portion 36 and the end surfaces of the first terminal electrodes 22. The space between the electrode facing portion 36 and the end surfaces of the first terminal electrodes 22 in the non-joint region 50b has a thickness that is approximately equal to a thickness of the connection member 50. In the present embodiment, the connection member 50 has a thickness that is determined based on a height of protrusions (projections) 36a mentioned below or so. The height of the joint regions 50a in the Z-axis direction shown in FIG. 2A corresponds to a first predetermined height.

In the present embodiment, first through holes 36b shown in FIG. 3A are formed on a part of the electrode facing portion 36 facing the first end surfaces 20a. Two first through holes 36b are formed correspondingly with the capacitor chips 20 contained in the capacitor 10, but any shape and number of the first through holes 36b may be formed. In the present embodiment, each of the first through holes 36b is formed in an approximately central part of the joint region 50a. Thus, each of the first through holes 36b is surrounded by a joint region where the terminal electrode 22 and the electrode facing portion 36 are joined by the connection member 50.

As shown in FIG. 3A, the joint region 50a is formed by applying the connection member 50 (see FIG. 2A) to initial application regions 50c respectively positioned both sides of the first through hole 36b in the Z-axis direction. That is, after the connection member 50 is applied, the joint region 50a is formed in such a manner that the connection member 50 applied on the initial application regions 50c spreads out by bringing a heating element into contact with the outer surface of the electrode facing portion 36 and pushing it against the end surface of the chip 20. The non-joint region 50b is a region where the connection member 50 is not spread out. In the present embodiment, a total area of the non-joint region 50b between the electrode facing portion 36 and the end surfaces of the terminal electrodes 22 in the Y-axis direction is larger than $3/10$, preferably $1/2$ to 10, of a total area of the joint regions 50a.

In the present embodiment, the connection member 50 composed of a solder forms a solder bridge between a periphery of the first through hole 36b and the first terminal electrode 22, and the electrode facing portion 36 and the first terminal electrode 22 can thereby be joined strongly. Moreover, an application state of the connection member 50 in the joint region 50a can be observed from outside via the first through hole 36b. Moreover, bubbles contained in the connection member 50, such as solder, can be released via the first through hole 36b. This stabilizes the joint even if the amount of the connection member 50, such as solder, is small.

The electrode facing portion 36 is provided with protrusions 36a protruding toward the first end surfaces 20a of the capacitor chips 20 (see FIG. 2A) and touching the first end surfaces 20a so that the protrusions 36a surround each of the first through holes 36b. In addition, the protrusions 36a may be formed outside the initial application regions 50c, or the initial application regions 50c may be positioned between the protrusions 36a and the first through hole 36b. Incidentally, the initial application region 50c may protrude from between the protrusion 36a and the first through hole 36b.

The protrusions 36a reduce a contact area between the electrode facing portion 36 and the first terminal electrodes 22. This makes it possible to prevent vibrations generated in the chip capacitors 20 from traveling to the mount board via the first metal terminal 30 and prevent an acoustic noise of the ceramic capacitor 10.

The protrusions 36a are formed around each of the first through holes 36b, and the joint region 50a formed by the spread of the connection member 50, such as solder, can thereby be adjusted. In the present embodiment, each of the joint region 50a has a periphery positioned slightly outside the protrusions 36a. In particular, as shown in FIG. 1A, a lower edge of each joint region 50a in the Z-axis direction is positioned near an upper opening edge of a second through hole (opening) 36c mentioned below.

In such a capacitor 10, an acoustic noise can be prevented while a connection strength between the electrode facing portion 36 and the first terminal electrodes 22 is adjusted in an appropriate range. Incidentally, four protrusions 36a are formed around one first through hole 36b in the capacitor 10, but any number and arrangement of the protrusions 36a may be employed.

The electrode facing portion 36 is provided with second through holes (openings) 36c having a periphery portion connected with the lower arm portion (lower holding portion) 31b or 33b, which is one of multiple pairs of the engagement arm portions 31a, 31b, 33a, and 33b. The second through holes 36c are positioned closer to the mount portion 38 than the first through holes 36b. Unlike the first through holes 36b, the second through holes 36c are not provided with any connection member, such as solder. That is, the second through holes 36c are formed in the non-joint region 50b.

Non-opening regions 36c1 are located on both sides of the second through hole 36c in the X-axis direction with the lower arm portion 31b (33b) supporting the capacitor chip 20. The non-opening regions 36c1 function as the non-joint region 50b between the first metal terminal 30 and the terminal electrodes 22 and have an easily deformable shape. Thus, the capacitor 10 having the first metal terminal 30 can favorably prevent an acoustic noise and have a favorable connection reliability with the mount board when being mounted.

The second through holes 36c have any shape, but preferably have an opening width in the width direction, which is a parallel direction (X-axis direction) to the terminal second sides 36ha and 36hb, that is wider than the first through holes 36b. When the second through holes 36c have a wide opening width, the first metal terminal 30 can effectively enhance a reduction effect on stress and a prevention effect on acoustic noise. When the first through holes 36b have an opening width that is narrower than the second through holes 36c, the connection member does not spread excessively. As a result, it is possible to prevent an excessive rise in connection strength between the capacitor chips 20 and the electrode facing portion 36 and prevent an acoustic noise.

In the present embodiment, as shown in FIG. 3A, each of the second through holes 36c is formed in the electrode facing portion 36 so that a part of the terminal electrode 22 (its lower part) corresponding to a lower part of the internal electrode layers 26 in the Z-axis direction is exposed to the outside between the mount portion 38 and the lower edge of the joint region 50a in the Z-axis direction. As shown in FIG. 2A, the non-joint region 50b, where the connection member 50 does not exist between the electrode facing portion 36 and the end surfaces of the terminal electrodes 22, is present in the non-opening regions 36c1 of the electrode facing portion 36 within a height L4 (second predetermined height) of the second through holes 36c in the Z-axis direction. In the present embodiment, the height L4 (second predetermined height) of the second through holes 36c in the Z-axis direction substantially corresponds to a height of the non-joint region 50b in the Z-axis direction located below the joint regions 50a in the Z-axis direction. The height L4 may, however, be smaller than a height of the non-joint region 50b in the Z-axis direction.

In the present embodiment, each of the second through holes 36c formed per chip 20 has a width in the X-axis direction that is preferably smaller than a width of each chip 20 in the X-axis direction. In the present embodiment, each of the second through holes 36c has a width in the X-axis direction that is preferably ⅙ to ⅚, more preferably ⅓ to ⅔, of a width of each chip 20 in the X-axis direction.

In the electrode facing portion 36, each of the second through holes 36c connected with the lower arm portion 31b is formed with a predetermined distance in the height direction against the terminal second side 36hb connected with the mount portion 38, and slits 36d are formed between the second through holes 36c and the terminal second side 36hb.

In the electrode facing portion 36, each of the slits 36d is formed between a connection position of the lower arm portion 31b positioned near the mount portion 38 with the electrode facing portion 36 (the lower side of the periphery of the second through hole 36c) and the terminal second side 36hb connected with the mount portion 38. The slits 36d extend in parallel to the terminal second sides 36ha and 36hb. The slits 36d can prevent a solder used at the time of mounting the capacitor 10 on a mount board from creeping up on the electrode facing portion 36 and prevent a formation of a solder bridge connected with the lower arm portions 31b and 33b or the first terminal electrodes 22. Thus, the capacitor 10 with the slits 36d demonstrates a prevention effect on acoustic noise.

As shown in FIG. 1A and FIG. 2A, the engagement arm portions 31a, 31b, 33a, and 33b of the first metal terminal 30 extend from the electrode facing portion 36 to the third or fourth side surfaces 20e or 20f, which are chip side surfaces of the capacitor chips 20. The lower arm portion 31b (or lower arm portion 33b), which is one of the engagement arm portions 31a, 31b, 33a, and 33b, is formed by being bent from the lower edge of the second through hole 36c in the Z-axis direction formed on the electrode facing portion 36.

The upper arm portion 31a (or upper arm portion 33a), which is another one of the engagement arm portions 31a, 31b, 33a, and 33b, is formed by being bent from the terminal second side 36ha at the upper part of the electrode facing portion 36 (positive side of the Z-axis direction). The upper arm portion 31a (or upper arm portion 33a) corresponds to an upper holding portion.

As shown in FIG. 1A, the electrode facing portion 36 has a plate body part 36j and a terminal connection part 36k. The plate body part 36j faces the first end surfaces 20a of the capacitor chips 20 and is positioned at a height overlapping with the first end surfaces 20a. The terminal connection part 36k is positioned below the plate body part 36j and is located at a position connecting between the plate body part 36j and the mount portion 38.

The second through holes 36c are formed so that their periphery portions range the plate body part 36j and the terminal connection part 36k. The lower arm portions 31b and 33b extend from the terminal connection part 36k. That is, bases of the lower arm portions 31b and 33b are connected with lower sides (opening peripheries near the mount portion 38) of approximately rectangular periphery portions of the second through holes 36c.

The lower arm portions 31b and 33b extend from the bases toward inside in the Y-axis direction (toward the central parts of the chips 20) while being bent, touch the fourth side surfaces 20f of the capacitor chips 20, and support the capacitor chips 20 from below (see FIG. 2A). Incidentally, the lower arm portions 31b and 33b may tilt upward in the Z-axis direction from the lower sides of the periphery portions of the second through holes 36c before the chips 20 are attached. This enables the lower arm portions 31b and 33b to touch the fourth side surfaces 20f of the chips 20 due to the resilience of the lower arm portions 31b and 33b.

Lower edges (chip second sides 20h below) of the first end surfaces 20a of the capacitor chips 20 are positioned slightly above the lower sides of the periphery portions of the second through holes 36c, which are the bases of the lower arm portions 31b and 33b. When viewing the capacitor chips 20 from the Y-axis direction as shown in FIG. 3A, the lower edges (chip second sides 20h below) of the first end surfaces 20a of the capacitor chips 20 can be recognized from the side of the capacitor 10 via the second through holes 36b.

As shown in FIG. 1A, a pair of upper arm portion 31a and lower arm portion 31b holds one capacitor chip 20, and a pair of upper arm portion 33a and lower arm portion 33b holds another one capacitor chip 20. Since a pair of upper arm portion 31a and lower arm portion 31b (or upper arm portion 33a and lower arm portion 33b) holds one capacitor chip 20, not multiple capacitor chips 20, the first metal terminal 30 can definitely hold each of the capacitor chips 20.

The pair of upper arm portion 31a and lower arm portion 31b does not hold the capacitor chip 20 from both ends of the chip second sides 20h, which are shorter sides of the first end surface 20a, but holds the capacitor chip 20 from both ends of the chip first sides 20g, which are longer sides of the first end surface 20a. This increases distances between the upper arm portions 31a and 33a and the lower arm portions 31b and 33b, and easily absorbs vibrations of the capacitor chips 20. Thus, the capacitor 10 can favorably prevent an acoustic noise.

Figure 1B:
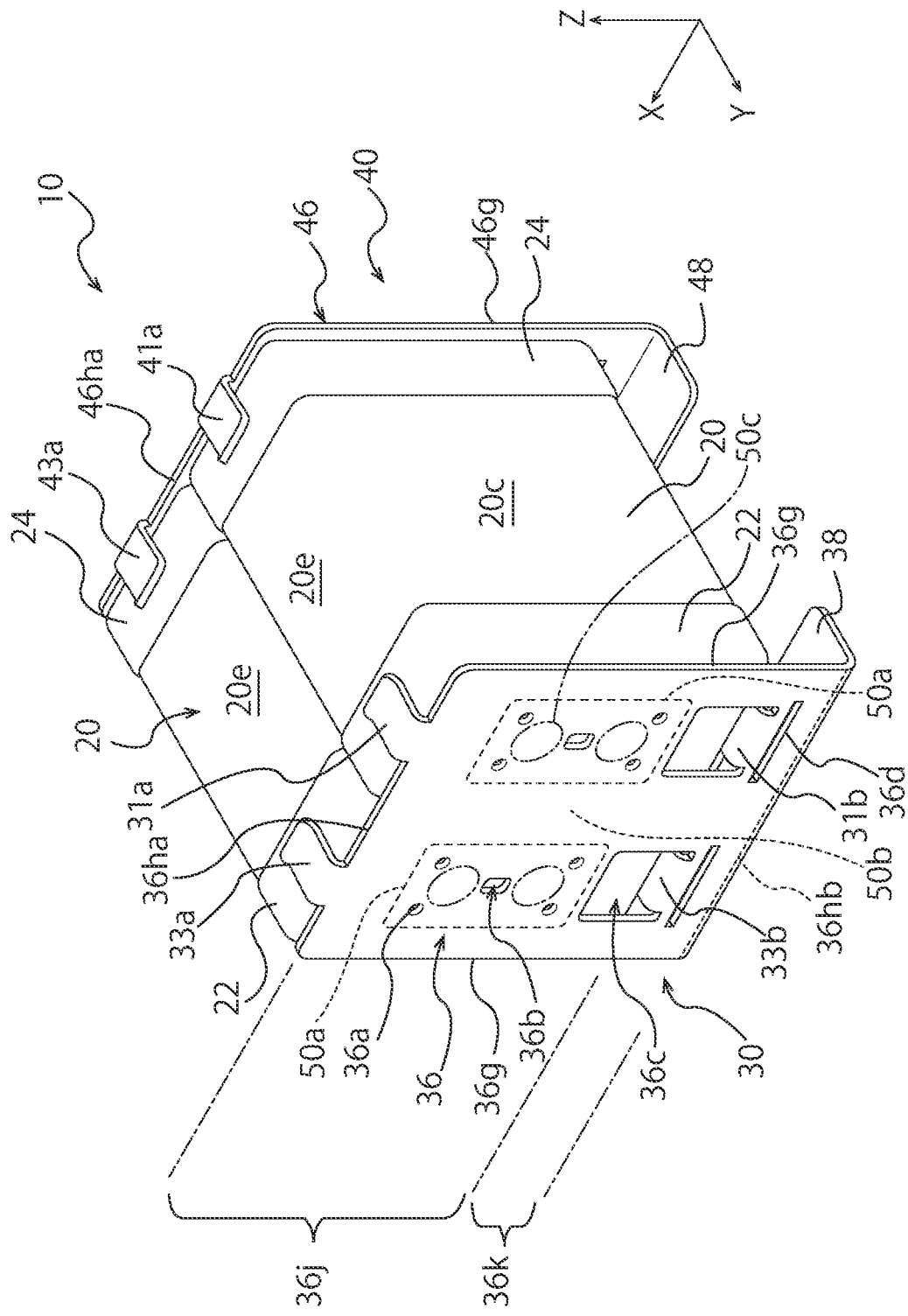
FIG. 1B is a schematic perspective view illustrating a ceramic electronic device having metal terminals according to another embodiment of the present invention.

Incidentally, as shown in FIG. 1B, the pair of upper arm portion 31a and lower arm portion 31b holding the capacitor chip 20 may have mutually asymmetry shapes and mutually different lengths in the width direction (lengths in the X-axis direction). Since the lower arm portions 31b and 33b extend from the terminal connection part 36k, the capacitor chips 20 have a short transmission path between the first terminal electrodes 22 and the mount board, compared to when the lower arm portions 31b and 33b are connected with the plate body part 36j.

The mount portion 38 is connected with the terminal second side 36hb below in the electrode facing portion 36 (negative side of the Z-axis direction). The mount portion 38 extends from the terminal second side 36hb below toward the capacitor chips 20 (negative side of the Y-axis direction) and is bent approximately perpendicularly to the electrode facing portion 36. Incidentally, the top surface of the mount portion 38, which is a surface of the mount portion 38 closer to the capacitor chips 20, preferably has a solder wettability that is lower than a solder wettability of the bottom surface of the mount portion 38 in order to prevent an excessive scattering of a solder used when the capacitor chips 20 are mounted on a board.

The mount portion 38 of the capacitor 10 is mounted on a mount surface, such as a mount board, in a position facing downward as shown in FIG. 1A and FIG. 2A. Thus, a height of the capacitor 10 in the Z-axis direction is a height of the capacitor 10 when being mounted. In the capacitor 10, the mount portion 38 is connected with the terminal second side 36hb on one side of the electrode facing portion 36, and the upper arm portions 31a and 33a are connected with the terminal second side 36ha on the other side of the electrode facing portion 36. Thus, the capacitor 10 has no unnecessary part of the length in the Z-axis direction and is advantageous in reducing its height.

Figure 5:
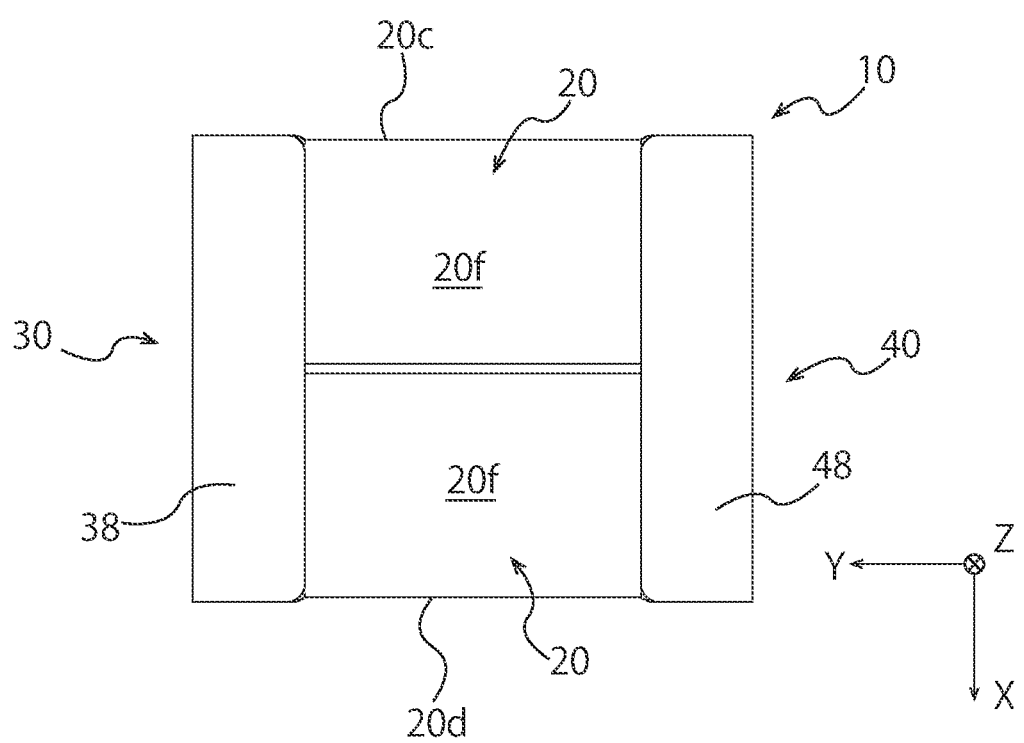
FIG. 5 is a bottom view of the ceramic electronic device shown in FIG. 1A.

Since the mount portion 38 is connected with the terminal second side 36hb on one side of the electrode facing portion 36, the capacitor 10 can have a small projection area in the Z-axis direction and have a small mount area, compared to prior arts where the mount portion 38 is connected with the terminal first sides 36g of the electrode facing portion 36. Since the third and fourth side surfaces 20e and 20f having small areas among the first to fourth side surfaces 20c to 20f of the capacitor chips 20 are arranged in parallel to the mount surface as shown in FIG. 1A, FIG. 5, etc., the capacitor 10 can have a small mount area even if the capacitor chips 20 are not overlapped with each other in the height direction.

As shown in FIG. 1A and FIG. 2A, the second metal terminal 40 has an electrode facing portion 46, a plurality of pairs of engagement arm portions 41a, 41b, 43a, and 43b, and a mount portion 48. The electrode facing portion 46 faces the second terminal electrodes 24. The engagement arm portions 41a, 41b, 43a, and 43b sandwich and hold the capacitor chips 20 from both ends of the chip first sides 20g in the Z-axis direction. The mount portion 48 extends from the electrode facing portion 46 toward the capacitor chips 20 and is at least partially approximately perpendicular to the electrode facing portion 46.

As is the case with the electrode facing portion 36 of the first metal terminal 30, the electrode facing portion 46 of the second metal terminal 40 has a pair of terminal first sides 46g approximately parallel to the chip first sides 20g and a terminal second side 46ha approximately parallel to the chip second sides 20h. Similarly to the protrusions 36a, the first through holes 36b, the second through holes 36c, and the slits 36d formed on the electrode facing portion 36, the electrode facing portion 46 is provided with protrusions (not illustrated), first through holes (not illustrated), second through holes (not illustrated), and slits 46d (see FIG. 6).

As shown in FIG. 1A, the second metal terminal 40 is arranged symmetrically to the first metal terminal 30 and is different from the first metal terminal 30 in arrangement against the capacitor chips 20. The second metal terminal 40 is, however, different from the first metal terminal 30 only in arrangement against the capacitor chips 20 and has a similar shape to the first metal terminal 30. Thus, the second metal terminal 40 is not described in detail.

The first metal terminal 30 and the second metal terminal 40 are composed of any conductive metal material, such as iron, nickel, copper, silver, and an alloy thereof. In particular, the first and second metal terminals 30 and 40 are preferably composed of phosphor bronze in consideration of restraining resistivity of the first and second metal terminals 30 and 40 and reducing ESR of the capacitor 10.

In the present embodiment, as shown in FIG. 3B, the metal terminal 30 includes units U1 and U2 corresponding to each capacitor chip 20 as chip component. Each of the units U1 and U2 includes the electrode facing portion 36 facing the terminal electrode of each capacitor chip 20, and the electrode facing portions 36 of the units U1 and U2 are continuous on the same plate plane.

The electrode facing portions 36 of the units U1 and U2 are respectively provided with the pair of arm portions 31a and 31b and the pair of arm portions 33a and 33b formed integrally with each electrode facing portion 36 and holding each chip 20 from above and below both ends of each chip 20 in the Z-axis direction.

In each of the units U1 and U2, the mount portion 38 is formed integrally with the electrode facing portion 36 below the lower arm portions 31b and 33b of the electrode facing portion 36 in the Z-axis direction. In particular, the mount portions 38 of the units U1 and U2 are preferably continuous in the X-axis direction in the present embodiment, but are not necessarily continuous in the X-axis direction and may be separate and independent in each of the units U1 and U2.

In each of the units U1 and U2, the electrode facing portion 36 is provided with protrusions 36a protruding from the electrode facing portion 36 toward the terminal electrode 22. In each of the units U1 and U2, the protrusions 36a are arranged substantially line-symmetrically to a virtual center line OL in the X-axis direction (parallel to the X-axis) passing through middle points O1 and O2 between the upper arm portion 31a (33a) and the lower arm portion 31b (33b) in the Z-axis direction.

Incidentally, "substantially line-symmetrically" does not mean exact line-symmetry, but means that a slight deviation from exact line-symmetry may be accepted. In the present embodiment, a central part of each terminal electrode 22 may be positioned at the central position of the protrusions 36a divided by the virtual center line OL in the Z-axis direction. In that case, the protrusions 36a divided by the virtual center line OL may not necessarily be line-symmetrical to the virtual center line OL.

For example, each of the middle points O1 and O2 between the upper arm portion 31a (33a) and the lower arm portion 31b (33b) in the Z-axis direction can be obtained in the following manner. Initially, obtained is a central point (middle point) of a width of the upper arm portion 31a (33a) in the X-axis direction. Likewise, obtained is a central point (middle point) of a width of the lower arm portion 31b (33b) in the X-axis direction. Then, a virtual vertical line is drawn by connecting the central point (middle point) of the upper arm portion 31a (33a) in the X-axis direction and the central point (middle point) of the lower arm portion 31b (33b) in the X-axis direction. The middle point O1 (O2) is the central point (middle point) of each virtual vertical line.

The virtual center line OL of the unit U1 and the virtual center line OL of the unit U2 are drawn to correspond to each other in the illustrated example, but may slightly be deviated from each other in the Z-axis direction. The virtual center lines OL preferably correspond to each other in the design stage, but may deviate from each other due to manufacturing errors. This is also the case with line-symmetry.

The metal terminal 30 according to the present embodiment can hold a plurality of capacitor chips 20 arranged next to each other in the X-axis direction parallel to the mount surface. In addition, the metal terminal 30 according to the present embodiment includes the units U1 and U2 corresponding to the respective chips 20, and each of the units U1 and U2 includes the electrode facing portion 36 facing the terminal electrode 22 of each chip 20 and the pair of upper arm portion 31a (33a) and lower arm portion 31b (33b) holding each chip 20 from both of the upper and lower ends of each chip 20 in the Z-axis direction.

Thus, if the metal terminal 30 according to the present embodiment is used, the plurality of chips 20 can be soldered to the metal terminal 30 while the chips 20 are being held by the upper arm portions 31a and 33a and the lower arm portions 31b and 33b, and the metal terminal 30 and the chips 20 are thereby joined more securely and stably. Incidentally, even if the metal terminal 30 and the chips 20 are joined using a connection member, such as conductive adhesive, instead of solder, the metal terminal 30 and the chips 20 are also joined more securely and stably.

In the metal terminal 30 according to the present embodiment, each of the units U1 and U2 includes protrusions 36a protruding from the electrode facing portion 36 toward the terminal electrode 22, and the protrusions 36a are arranged line-symmetrically to the virtual center line OL in each of the units U1 and U2. Thus, the protrusions 36a can uniformly control a thickness of the connection member 50 (see FIG. 2A and FIG. 2B), such as solder and conductive adhesive, to be placed between the metal terminal 30 and the terminal electrode 22 of each chip 20. Thus, the connection strength between the metal terminal 30 and each chip 20 is improved uniformly.

The metal terminal 30 according to the present embodiment includes the mount portion 38 below the lower arm portions 31b and 33b in the Z-axis direction in each of the units U1 and U2 corresponding to each chip 20. Thus, electric passages from the terminal electrode 22 of each chip 20 to the mount surface, such as circuit board, via the electrode facing portion 36 and the mount portion 38 have the same length, and electronic characteristics, such as ESR, of the chips 20 can be uniform.

In the metal terminal 30 according to the present embodiment, the units U1 and U2 can have substantially the same holding structure of the metal terminal 30 from the terminal electrode 22 of each chip 20 held in each of the units U1 and U2 of the metal terminal 30 to the circuit board connected with the mount portion 38. Thus, the units U1 and U2 can have a common structure where vibrations of each chip 20 are hard to travel to the circuit board, and a so-called acoustic noise phenomenon is easily prevented.

Moreover, there is no need to provide a protrusion that divides the chips 20 between the units U1 and U2 adjacent to each other of the metal terminal 30 according to the present embodiment. Thus, the plurality of chips 20 can be stably and easily attached to the metal terminal 30 even if the chips 20 connected by the metal terminal 30 have slightly varied lengths in the X-axis direction. Incidentally, the variation of the chip components 20 in height in the Z-axis direction can be absorbed by elastic deformation with the upper arm portions 31a and 33a and the lower arm portions 31b and 33b, and even in this case, the plurality of chips 20 can stably and easily be attached to the metal terminal 30.

If the number of chips 20 to be connected with the metal terminal 30 is desired to increase, the metal terminal 30 should be designed so that the number of units U1 and U2 having the same structure to be provided in the metal terminal 30 increases, and it is easy to increase and decrease the number of chips 20 to be attached to the metal terminal 30.

In each of the units U1 and U2 of the present embodiment, the first through hole 36b is formed at a position corresponding to the middle point O1 (O2) between the upper arm portion 31a (33a) and the lower arm portion 31b (33b) in the Z-axis direction. When the first through hole 36b is provided in each unit, an application state of the connection member 50, such as solder, can be observed from outside via the first through hole 36b. Moreover, bubbles contained in the connection member 50, such as solder, can be released via the first through holes 36b. This stabilizes the joint even if the amount of the connection member 50, such as solder, is small. Thus, variation in quality is reduced, and the non-defective rate can be improved.

Incidentally, each of the middle points O1 and O2 should be positioned in the first through hole 36b, but the center of the first through hole 36b does not need to correspond with the middle point O1 (O2). Instead, the central part of the terminal electrode 22 in the Z-axis direction should be within the first through hole 36b.

In the present embodiment, the lower arm portion 31b (33b) is formed to be bent from the lower edge of the second through hole 36c in the Z-axis direction formed in the electrode facing portion 36. In this structure, the second through hole 36c and the lower arm portion 31b (33b) can be formed easily simultaneously. The second through hole 36c and the lower arm portion 31b (33b) are arranged closely, and vibrations of the chips 20 can more effectively be prevented from traveling to the metal terminal 30.

In the second through hole 36c, vibrations do not travel from the chip 20 to the metal terminal 30. Vibrations are easily generated by electrostrictive phenomenon particularly in a part where the internal electrodes 26 of the chip 20 are laminated via the dielectric layers 28 as shown in FIG. 6, but vibrations can effectively be prevented from traveling in a part where the second through hole 36c shown in FIG. 3B is formed. Thus, acoustic phenomenon can effectively be prevented.

Moreover, since the lower arm portion 31b (33b) is formed to be bent from the lower edge of the second through hole 36c, the lower arm portion 31b (33b), which has an excellent elasticity, can receive the weight of each chip 20. Thus, the metal terminal 30 can effectively demonstrate a reduction effect on stress generated in the capacitor 10 and an absorption effect on vibrations. Moreover, vibrations of the chips 20 are hard to travel to the metal terminal 30, and acoustic phenomenon can effectively be prevented.

In the present embodiment, since the electrode facing portions 36 of the units U1 and U2 are formed by a plate material continuing in the X-axis direction, there is also an effect on easy manufacturing of the metal terminal 30.

Hereinafter, a manufacturing method of the capacitor 10 is described.

Manufacturing Method of Multilayer Capacitor Chip 20

In a manufacture of the multilayer capacitor chip 20, a laminated body is prepared by laminating green sheets (to be the dielectric layers 28 after firing) with electrode patterns to be the internal electrode layers 26 after firing, and a capacitor element body is obtained by pressurizing and firing the obtained laminated body. Moreover, the first and second terminal electrodes 22 and 24 are formed on the capacitor element body by baking and plating a terminal electrode paint, and the capacitor chip 20 is thereby obtained.

A green sheet paint and an internal electrode layer paint, which are raw materials of the laminated body, a raw material of the terminal electrodes, firing conditions of the laminated body and the electrodes, and the like are not limited, and can be determined with reference to known manufacturing methods or so. In the present embodiment, ceramic green sheets whose main component is barium titanate are used as a dielectric material. In the terminal electrodes, a Cu paste is immersed and baked to form a baked layer, and a Ni plating treatment and a Sn plating treatment are conducted, whereby Cu baked layer/Ni plating layer/Sn plating layer is formed.

Manufacturing Method of Metal Terminals 30 and 40

In a manufacture of the first metal terminal 30, a metal plate is firstly prepared. The metal plate is composed of any conductive metal material, such as iron, nickel, copper, silver, and an alloy thereof. Next, the metal plate is machined to form intermediate members having shapes of the engagement arm portions 31a to 33b, the electrode facing portion 36, the mount portion 38, and the like.

Next, a metal film is formed by plating on the surfaces of the intermediate members formed by machining, and the first metal terminal 30 is obtained. Any material, such as Ni, Sn, and Cu, is used for the plating. In the plating treatment, a resist treatment against a top surface of the mount portion 38 can prevent the plating from attaching to the top surface of the mount portion 38. This makes it possible to generate a difference in solder wettability between the top surface and the bottom surface of the mount portion 38. Incidentally, a similar difference can be generated by conducting a plating treatment against the entire intermediate members for formation of a metal film and removing only the metal film formed on the top surface of the mount portion 38 using a laser exfoliation or so.

Incidentally, in the manufacture of the first metal terminals 30, a plurality of first metal terminals 30 may be formed in a state of being connected with each other from a metal plate continuously formed in belt shape. The plurality of first metal terminals 30 connected with each other is cut into pieces before or after being connected with the capacitor chip 20. The second metal terminal 40 is manufactured in a similar manner to the first metal terminal 30.

Assembly of Capacitor 10

Two capacitor chips 20 obtained in the above-mentioned manner are prepared and held so that the second side surface 20d and the first side surface 20c are arranged to touch each other as shown in FIG. 1A. Then, a rear surface of the first metal terminal 30 faces the end surfaces of the first terminal electrodes 22 in the Y-axis direction, and the second metal terminal 40 faces the end surfaces of the second terminal electrodes 24 in the Y-axis direction.

At this time, the connection member 50 (see FIG. 2A), such as solder, is applied to the initial application regions 50c shown in FIG. 1A and FIG. 3A on the end surfaces of the first terminal electrodes 22 in the Y-axis direction or on the rear surface of the first metal terminal 30. The connection member 50 (see FIG. 2A), such as solder, is similarly applied at positions corresponding with the initial application regions 50c shown in FIG. 1A and FIG. 3A on the end surfaces of the second terminal electrodes 24 in the Y-axis direction or on the rear surface of the second metal terminal 40.

Thereafter, the joint region 50a is formed in such a manner that the connection member 50 applied on the initial application region 50c spreads out by pushing a heating element (not illustrated) from the outer surface of the electrode facing portion 36 (the same applies to the electrode facing portion 46) against the end surfaces of the chips 20. The non-joint region 50b is a region where the connection member 50 is not spread out. This allows the first and second metal terminals 30 and 40 to be electrically and mechanically connected with the first and second terminal electrodes 22 and 24 of the capacitor chips 20. Then, the capacitor 10 is obtained.

In the capacitor 10 obtained in this way, a height direction (Z-axis direction) of the capacitor 10 is identical to directions of the chip first sides 20g, which are longer sides of the capacitor chips 20, and the mount portions 38 and 48 are formed by being bent from the terminal second side 36hb toward below the capacitor chips 20. Thus, the capacitor 10 has a small projection area in the height direction of the capacitor 10 (see FIG. 4 and FIG. 5), and can have a small mount area.

In the capacitor 10, a plurality of capacitor chips 20 is arranged side by side in the parallel direction to the mount surface. In the capacitor 10, for example, only one capacitor chip 20 is held between a pair of engagement arm portions 31a and 31b in the engagement direction (Z-axis direction). Thus, the capacitor 10 has a high connection reliability between the capacitor chips 20 and the metal terminals 30 and 40, and has a high reliability for impact and vibrations.

Moreover, since a plurality of capacitor chips 20 is arranged and laminated in the parallel direction to the mount surface, the capacitor 10 has a short transmission path and can achieve a low ESL. Since the capacitor chips 20 are held perpendicularly to the lamination direction of the capacitor chips 20, the first and second metal terminals 30 and 40 can hold the capacitor chips 20 without any problems even if the length L2 of the chip second side 20h of the capacitor chip 20 varies due to change in the lamination number of the internal electrode layers 26 and the dielectric layers 28 of the capacitor chips 20 to be held. Since the first and second metal terminals 30 and 40 can hold the capacitor chips 20 having various lamination numbers of the internal electrode layers 26 and the dielectric layers 28, the capacitor 10 can flexibly respond to design change.

In the capacitor 10, the upper arm portions 31a and 33a and the lower arm portions 31b and 33b sandwich and hold the capacitor chips 20 from both ends of the chip first sides 20g, which are longer sides of the first end surfaces 20a of the capacitor chips 20. Thus, the first and second metal terminals 30 and 40 can effectively demonstrate a restraint effect on stress, prevent a transmission of vibrations from the capacitor chips 20 to the mount board, and prevent an acoustic noise.

Since the lower arm portions 31b and 33b are formed to be bent at the lower opening peripheries of the second through holes 36c, the lower arm portions 31b and 33b of the capacitor 10 can be arranged at overlapped positions with the mount portion 38 when viewed from the perpendicular direction (Z-axis direction) to the mount surface (see FIG. 2A and FIG. 5). Thus, the capacitor 10 can have a wide mount portion 38 and is advantageous in downsizing.

In the present embodiment, the non-joint region 50b, which does not connect between the electrode facing portion 36 (46) and the end surfaces of the terminal electrodes 22 (24), is formed between the peripheries of the joint regions 50a and the engagement arm portions 31a, 31b, 33a, and 33b (the same applies to 41a, 41b, 43a, and 43b). In the non-joint region 50b, the electrode facing portion 36 (46) of the metal terminal 30 (40) can freely elastically be deformed without being disturbed by the terminal electrode 22 (24), and stress is reduced. This favorably maintains an elastic property of the engagement arm portions 31a, 31b, 33a, and 33b (41a, 41b, 43a, and 43b) continuing to the non-joint region 50b, and the chips 20 can favorably be held between a pair of engagement arm portions 31a and 31b and between a pair of engagement arm portions 33a and 33b. In addition, the metal terminal 30 (40) is easily elastically deformed, and an acoustic noise phenomenon can be prevented effectively.

A total area of the non-joint region 50b between the electrode facing portion 36 (46) and the terminal electrodes 22 (24) is larger than 3/10 of a total area of the joint regions 50a and is within a predetermined range. This structure improves the effects of the present embodiment.

In the non-joint region 50b, a space whose thickness is approximately equal to a thickness of the connection member 50 exists between the electrode facing portion 36 (46) and the end surfaces of the terminal electrodes 22 (24). The space enables the electrode facing portion 36 (46) of the non-joint region 50b to freely elastically be deformed without any disturbance from the metal terminal 30 (40).

Moreover, as shown in FIG. 3A, the end surfaces of the terminal electrodes 22 (24) of a plurality of chips 20 may be joined side by side with the electrode facing portion 36 (46) in a plurality of joint regions 50a, and the non-joint region 50b is also formed between the joint regions 50a adjacent to each other. In this structure, a pair of metal terminals 30 and 40 can easily connect a plurality of chips 20, and an acoustic noise phenomenon can be prevented due to existence of the non-joint region 50b existing between the chips 20.

Moreover, in the present embodiment, the electrode facing portion 36 (46) is provided with the second through holes 36c going through the front and back surfaces of the electrode facing portion 36 (46) in the non-joint region 50b. The arm portions 31b and 33b (41b and 43b) extend from the opening peripheries of the second through holes 36c. Since the second through holes 36c are formed, the non-joint region 50b can be formed easily, the arm portions 31b and 33b (41b and 43b) can be formed easily, and the chips 20 are held firmly.

Moreover, in the present embodiment, the protrusions 36a protruding toward the end surfaces of the terminal electrodes 22 (24) are formed on the inner surface of the electrode facing portion 36 (46). This structure can easily control the joint regions 50a of the connection member 50 and a thickness of the joint regions 50a. In addition, this structure stabilizes the connection of the connection member even if the amount of the connection member is small.

In the present embodiment, as shown in FIG. 2A, the non-joint region 50b, where the connection member 50 is not present between the electrode facing portion 36 and the end surfaces of the terminal electrodes 22, is present in the non-opening regions 36c1 of the electrode facing portion 36 within a height L4 in the Z-axis direction corresponding to the second through holes 36c shown in FIG. 3A. In the non-joint region 50b, the electrode facing portion 36 of the metal terminal 30 can freely elastically be deformed without being disturbed by the terminal electrodes 22, and stress is reduced. This favorably maintains an elastic property of the lower arm portions 31b and 33b as the holding portions continuing to the non-opening regions 36c1, and the chips 20 can favorably be held by the lower arm portions 31b and 33b. In addition, the metal terminal 30 is easily elastically deformed, and an acoustic noise phenomenon can be prevented effectively.

Moreover, the lower arm portions 31b and 33b are formed in the second through holes 36c near the mount portion in the present embodiment. In this structure, electrostrictive strain vibrations of the internal electrodes 26 can be prevented from traveling to the metal terminal 30 near the mount portion 38. The lower arm portions 31b and 33b are hard to be influenced by the electrostrictive strain vibrations and can securely hold the chips 20.

Second Embodiment

Figure 7:
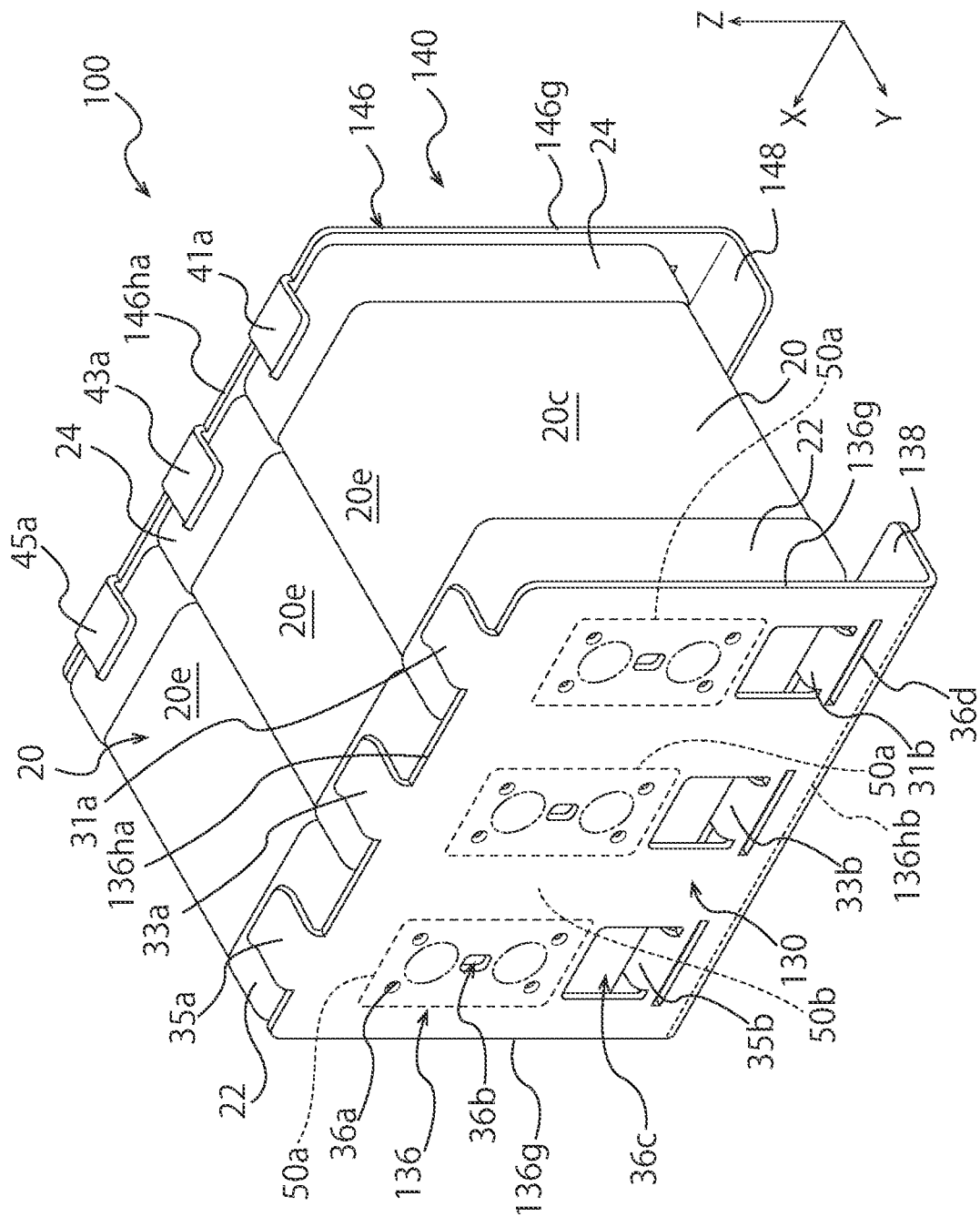
FIG. 7 is a schematic perspective view illustrating a ceramic electronic device having metal terminals according to another embodiment of the present invention.

FIG. 7 is a schematic perspective view of a capacitor 100 according to Second Embodiment of the present invention. FIG. 8 to FIG. 11 are respectively a front view, a left-side view, a top view, and a bottom view of the capacitor 100. As shown in FIG. 7, the capacitor 100 is similar to the capacitor 10 according to First Embodiment except that the capacitor 100 has three capacitor chips 20 and a different number of first through holes 36b or so contained in a first metal terminal 130 and a second metal terminal 140. In the description of the capacitor 100, similar parts to the capacitor 10 are provided with similar references to the capacitor 10 and are not described.

Figure 8:
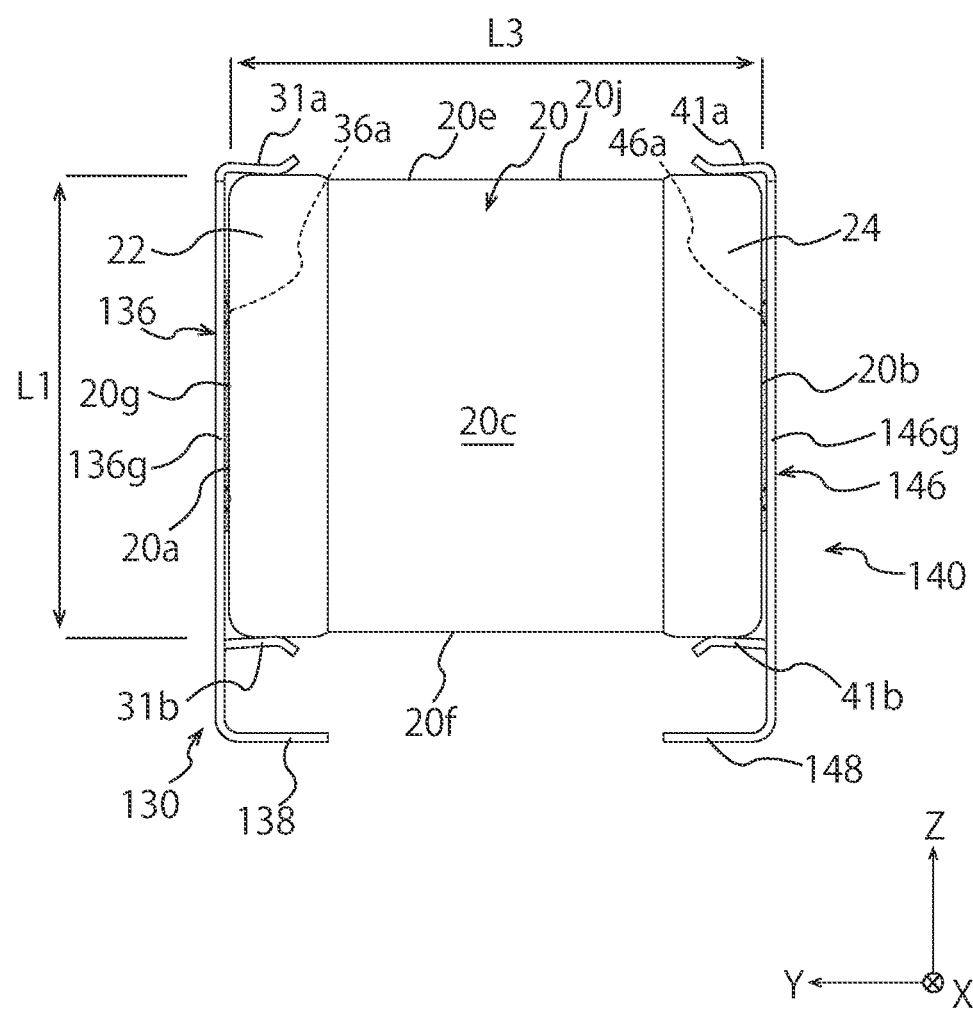
FIG. 8 is a front view of the ceramic electronic device shown in FIG. 7.
Figure 10:
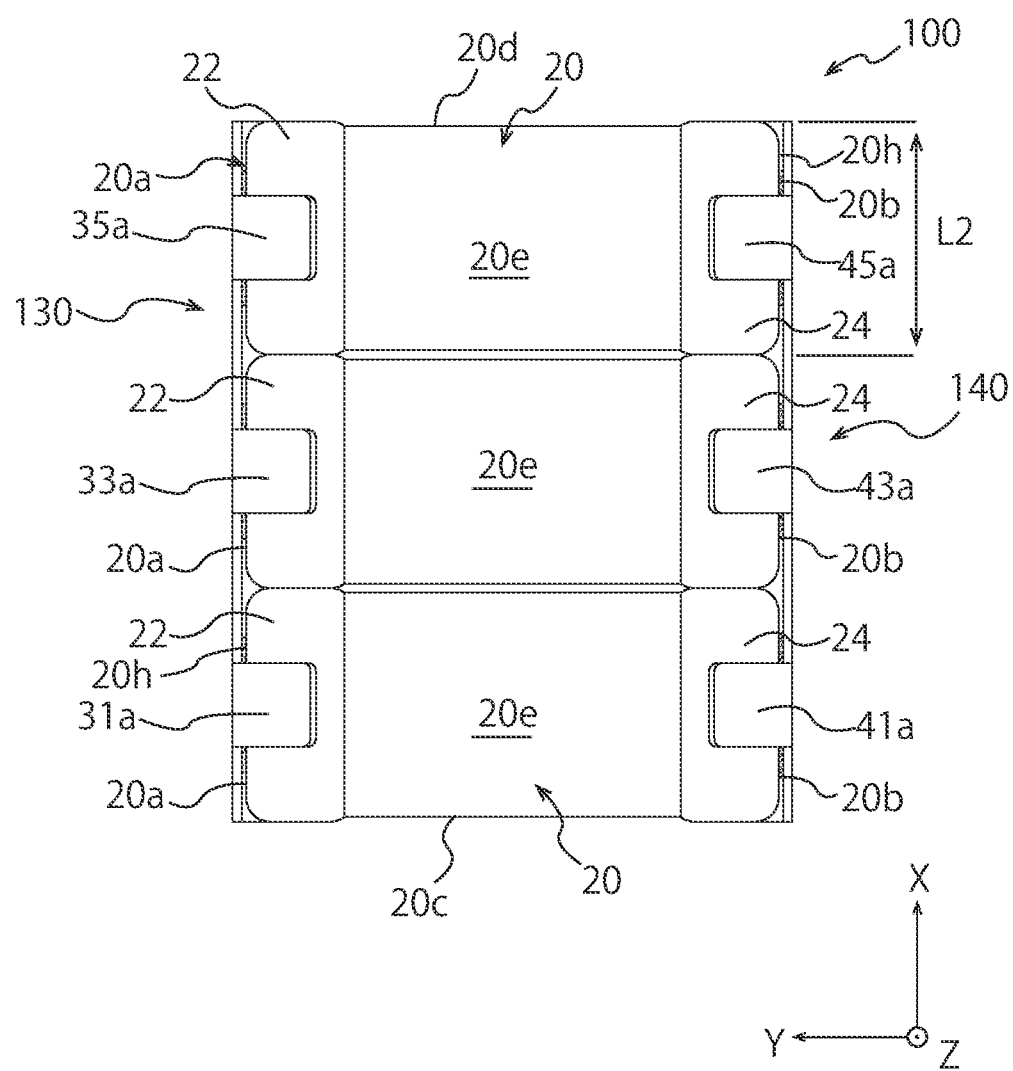
FIG. 10 is a top view of the ceramic electronic device shown in FIG. 7.

As shown in FIG. 7, the capacitor chips 20 contained in the capacitor 100 are similar to the capacitor chips 20 contained in the capacitor 10 shown in FIG. 1A. The three capacitor chips 20 contained in the capacitor 100 are arranged so that chip first sides 20g are perpendicular to a mount surface as shown in FIG. 8, and that chip second sides 20h are parallel to a mount surface as shown in FIG. 10. The three capacitor chips 20 contained in the capacitor 100 are arranged in parallel to a mount surface so that the first terminal electrodes 22 of the capacitor chips 20 adjacent to each other are mutually in contact with, and that the second terminal electrodes 24 of the capacitor chips 20 adjacent to each other are mutually in contact with.

The first metal terminal 130 contained in the capacitor 100 has an electrode facing portion 136, three pairs of engagement arm portions 31a, 31b, 33a, 33b, 35a, and 35b, and a mount portion 138. The electrode facing portion 136 faces the first terminal electrodes 22. The three pairs of engagement arm portions 31a, 31b, 33a, 33b, 35a, and 35b hold the capacitor chips 20. The mount portion 138 is bent perpendicularly from a terminal second side 136hb of the electrode facing portion 136 toward the capacitor chips 20. The electrode facing portion 136 has a substantially rectangular flat shape, and has a pair of terminal first sides 136g approximately parallel to the chip first sides 20g and a pair of terminal second sides 136ha and 136hb approximately parallel to the chip second sides 20h.

Figure 9:
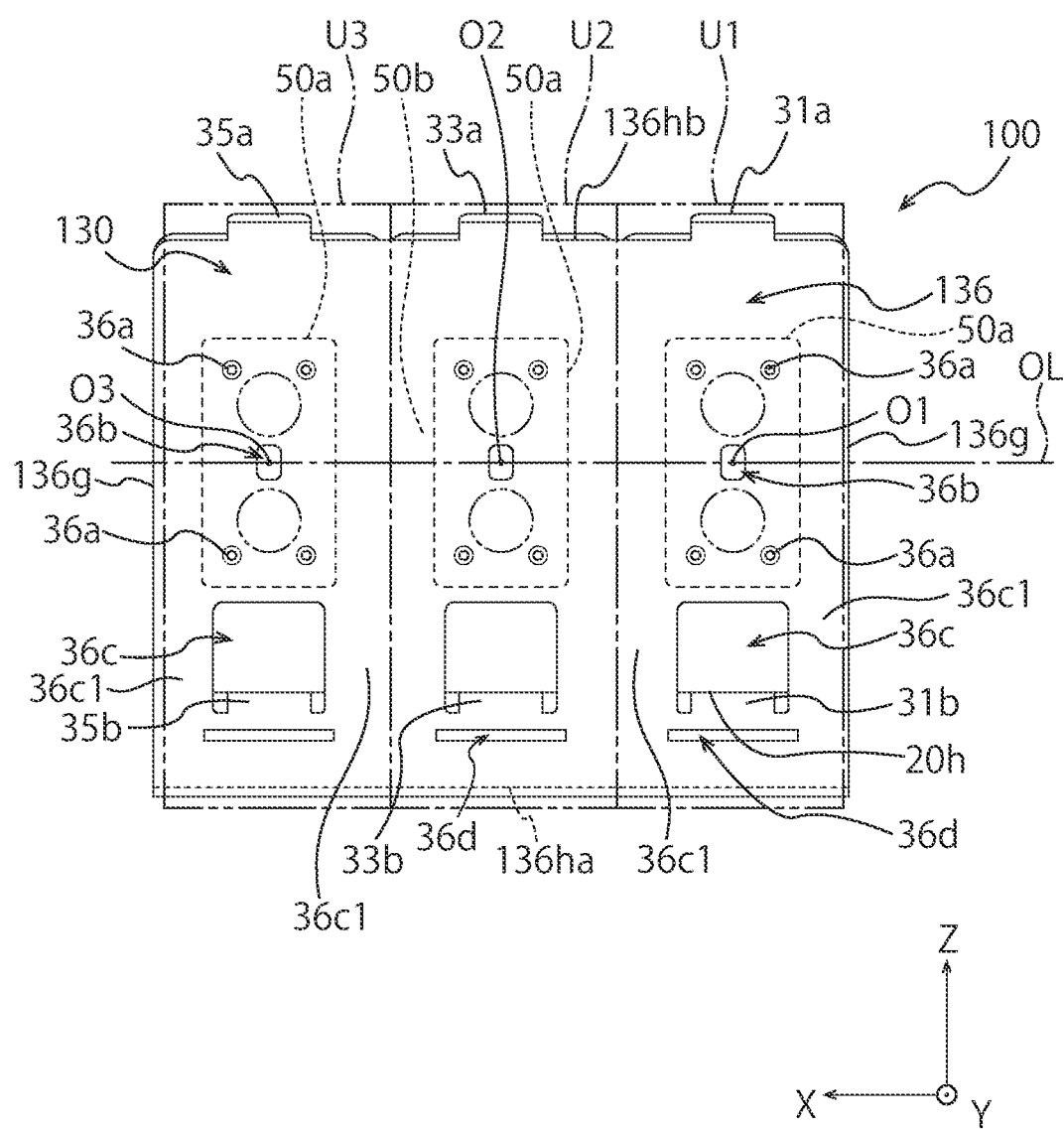
FIG. 9 is a left-side view of the ceramic electronic device shown in FIG. 7.

As is the case with the first metal terminal 30 shown in FIG. 3A, the first metal terminal 130 is provided with the protrusions 36a, the first through holes 36b, the second through holes 36c, and the slits 36d as shown in FIG. 9. The first metal terminal 130 is, however, provided with three first through holes 36b, three second through holes 36c, and three slits 36d, and one first through hole 36b, one second through hole 36c, and one slit 36d correspond with one capacitor chip 20. The first metal terminal 130 is provided with 12 protrusions 36a in total, and the four protrusions 36a correspond with each of the capacitor chips 20.

That is, the first through holes 36b of the present embodiment are formed at positions corresponding to the middle points O1, O2, and O3 between the upper arm portions 31a, 33a, and 35a and the lower arm portions 31b, 33b, and 35b in the Z-axis direction in the units U1, U2, and U3 of the metal terminal 130. Each of the units U1, U2, and U3 includes protrusions 36a protruding from the electrode facing portion 36 toward each of the terminal electrodes 22, and the protrusions 36a are arranged line-symmetrically to the virtual center line OL in each of the units U1, U2, and U3.

In the first metal terminal 130, as shown in FIG. 10, the upper arm portion 31a and the lower arm portion 31b hold one of the capacitor chips 20, the upper arm portion 33a and the lower arm portion 33b hold another one of the capacitor chips 20, and the upper arm portion 35a and the lower arm portion 35b hold another one of the capacitor chips 20 that is different from the above two capacitor chips 20. The upper arm portions 31a, 33a, and 35a are connected with the terminal second side 136ha at the upper part of the electrode facing portion 136 (positive side of the Z-axis direction), and the lower arm portions 31b, 33b, and 35b are connected with periphery portions of the second through holes 36c.

Figure 11:
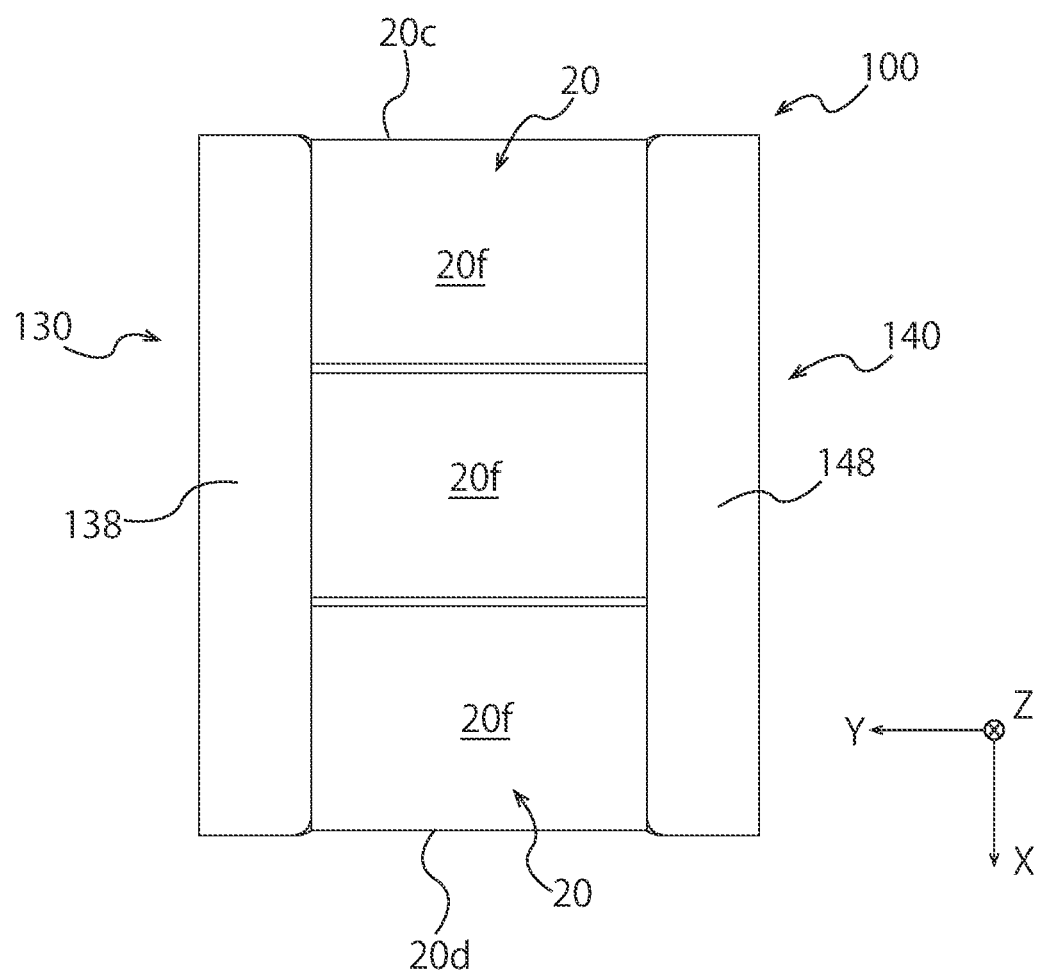
FIG. 11 is a bottom view of the ceramic electronic device shown in FIG. 7.

As shown in FIG. 8 and FIG. 11, the mount portion 138 of the first metal terminal 130 is connected with the terminal second side 136hb at the lower part of the electrode facing portion 136 (negative side of the Z-axis direction). The mount portion 138 extends from the terminal second side 136hb toward the capacitor chips 20 (negative side of the Y-axis direction) and is bent approximately perpendicularly to the electrode facing portion 136.

The second metal terminal 140 has an electrode facing portion 146, a plurality of pairs of engagement arm portions 41a, 43a, and 45a, and a mount portion 148. The electrode facing portion 146 faces the second terminal electrodes 24. The engagement arm portions 41a, 43a, and 45a sandwich and hold the capacitor chips 20 from both ends of the chip first sides 20g in the Z-axis direction. The mount portion 148 extends from the electrode facing portion 146 toward the capacitor chips 20 and is at least partially approximately perpendicular to the electrode facing portion 146.

As is the case with the electrode facing portion 136 of the first metal terminal 130, the electrode facing portion 146 of the second metal terminal 140 has a pair of terminal first sides 146g approximately parallel to the chip first sides 20g and a terminal second side 146ha approximately parallel to the chip second sides 20h, and the electrode facing portion 146 is provided with the protrusions 46a, first through holes, second through holes, and slits. As shown in FIG. 7, the second metal terminal 140 is arranged symmetrically to the first metal terminal 130 and is different from the first metal terminal 130 in arrangement to the capacitor chips 20. The second metal terminal 140 is, however, different from the first metal terminal 130 only in arrangement and has a similar shape to the first metal terminal 130. Thus, the second metal terminal 140 is not described in detail.

The capacitor 100 having the metal terminal 130 according to Second Embodiment demonstrates similar effects to those of the capacitor 10 having the metal terminal 30 according to First Embodiment. Incidentally, the numbers of upper arm portions 31a to 35a, lower arm portions 31b to 35b, first through holes 36b, second through holes 36c, and slits 36d contained in the first metal terminal 130 of the capacitor 100 are the same as the number of capacitor chips 20 contained in the capacitor 100, but the number of engagement arm portions or so contained in the capacitor 100 is not limited thereto.

Other Embodiments

Incidentally, the present invention is not limited to the above-mentioned embodiments, and may variously be changed within the scope of the present invention.

For example, the metal terminal 30 (40) includes the protrusion 36a, the first through hole 36b, and the slit 36d as necessary, but the metal terminal of the present invention is not limited to the metal terminal 30 (40) and may be a variation failing to include one or some of the protrusion 36a, the first through hole 36b, and the slit 36d.

For example, as shown in FIG. 3B, if the first through holes 36b are formed at positions corresponding to the middle points O1 and O2 between the upper arm portions 31a and 33a and the lower arm portions 31b and 33b in the Z-axis direction in the units U1 and U2, the protrusions 36a may not be necessarily arranged.

When each of the units U1 and U2 is provided with the first through hole 36, an application state of the connection member 50, such as solder, can be observed from outside via the first through holes 36b. Moreover, bubbles contained in the connection member 50, such as solder, can be released via the first through holes 36b. This stabilizes the joint even if the amount of the connection member 50, such as solder, is small.

In the above-mentioned embodiments, both of the metal terminals 30 and 40 have the same structure, which is favorable, but the metal terminals 30 and 40 do not necessarily have the same structure and may have different structures.

Figure 12:
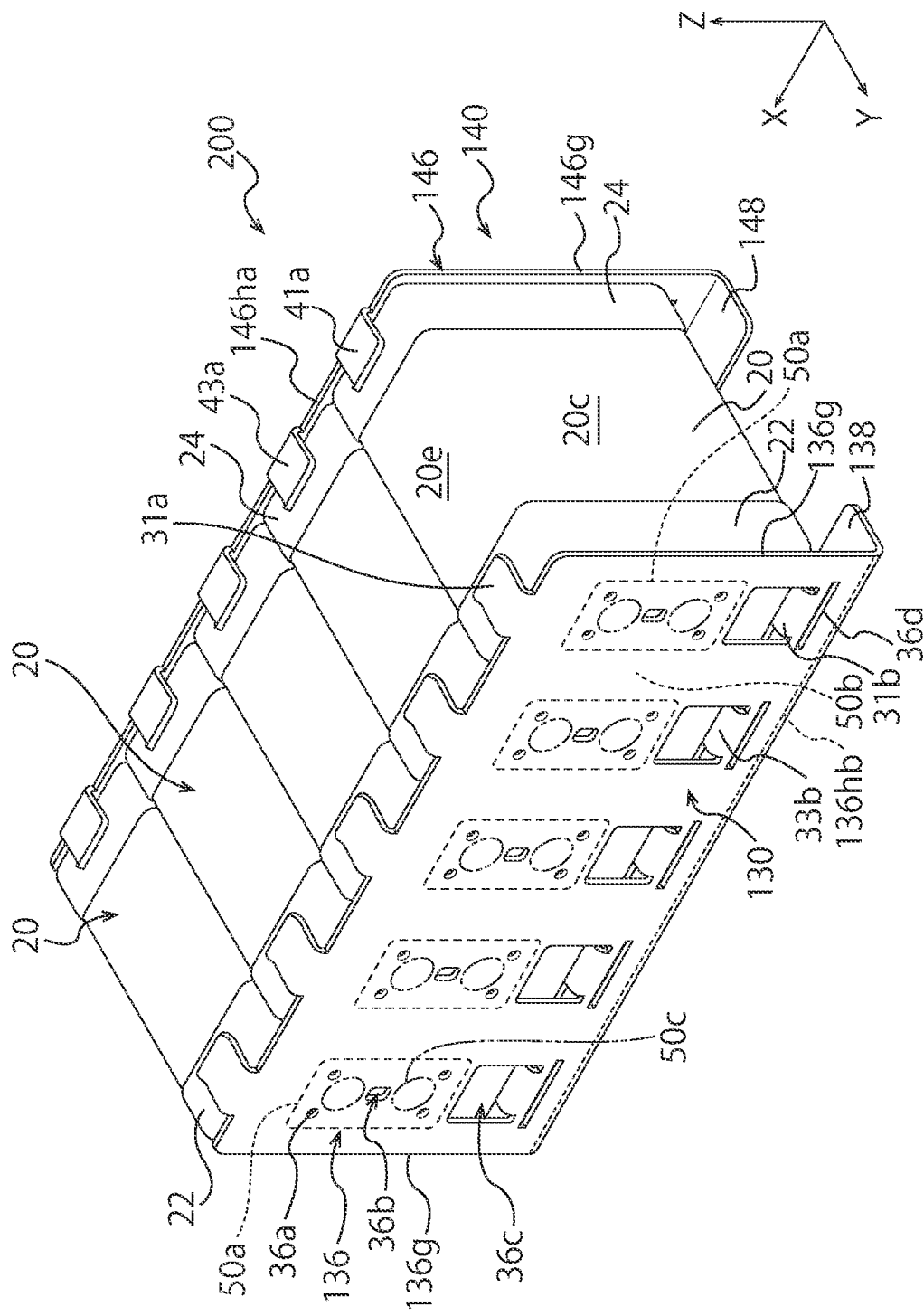
FIG. 12 is a schematic perspective view illustrating a ceramic electronic device having metal terminals according to a variation of the embodiment shown in FIG. 7.
Figure 13:
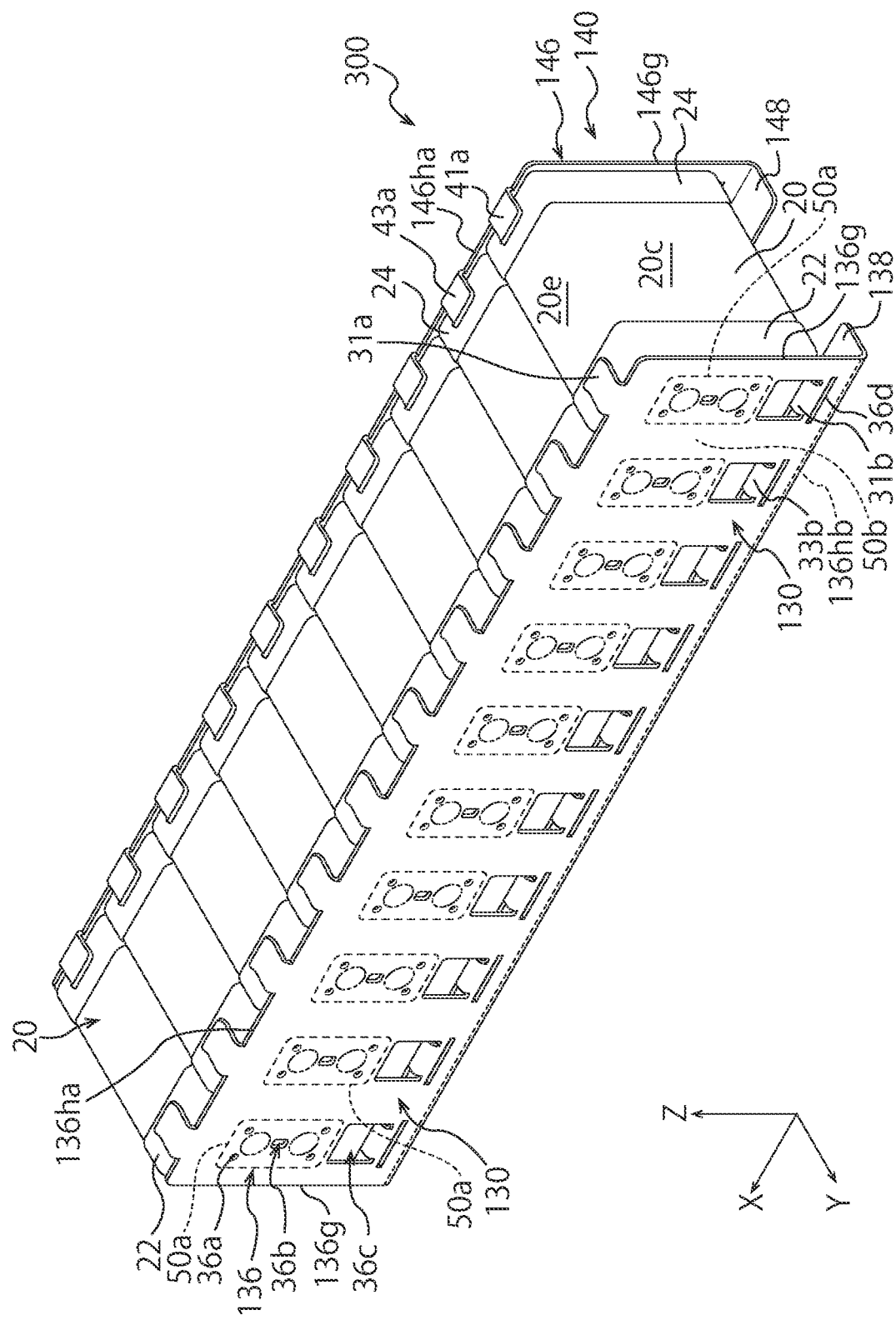
FIG. 13 is a schematic perspective view illustrating a ceramic electronic device having metal terminals according to a variation of the embodiment shown in FIG. 12.

In the present invention, the number of chips owned by the electronic device (the number of units not shown) is any plural. For example, the metal terminals 130 and 140 of the capacitor 200 shown in FIG. 12 respectively have five units and hold five capacitor chips 20 in the X-axis direction. Moreover, the metal terminals 130 and 140 of the capacitor 300 shown in FIG. 13 respectively have 10 units and hold 10 capacitor chips 20 in the X-axis direction.

NUMERICAL REFERENCES 10, 10a, 100, 200, 300 . . . capacitor
20 . . . capacitor chip
20a . . . first end surface
20b . . . second end surface
20c . . . first side surface
20d . . . second side surface
20e . . . third side surface
20f . . . fourth side surface
20g . . . chip first side 20h . . . chip second side
20j . . . chip third side
22 . . . first terminal electrode
24 . . . second terminal electrode
26 . . . internal electrode layer
28 . . . dielectric layer
30, 130, 40, 140 . . . metal terminal
31a, 33a, 35a, 41a, 43a, 45a . . . upper arm portion (upper holding portion)
31b, 33b, 35b, 41b, 43b . . . lower arm portion (lower holding portion)
36, 136, 46, 146 . . . electrode facing portion
36a, 46a . . . protrusion
36b . . . first through hole
36c . . . second through hole
36c1 . . . non-opening region
36d, 46d . . . slit
36g . . . terminal first side
36ha, 36hb . . . terminal second side
38, 138, 48, 148 . . . mount portion
50 . . . connection member
50a . . . joint region
50b . . . non-joint region
50c . . . initial application region
U1, U2 . . . unit
O1, O2 . . . middle point
OL . . . virtual center line

What is claimed is:

1. A metal terminal connectable to terminal electrodes respectively formed on ends in a second axis direction of a plurality of chip components arranged side by side in a first axis direction, comprising units each associated with one of the chip components, each of the units comprising:
an electrode facing portion configured to face the terminal electrode of the associated chip component;
a pair comprised of an upper holding portion and a lower holding portion configured to hold the chip component in a third axis direction substantially perpendicular to the first and second axis directions;
a mount portion located at a lower side of the electrode facing portion and below the lower holding portion in the third axis direction; and
protrusions protruding from the electrode facing portion, configured to protrude toward the terminal electrode,
wherein the protrusions in each of the units are arranged substantially line-symmetrically to a virtual center line in the first axis direction passing through a middle point between the upper holding portion and the lower holding portion in the third axis direction.

2. The metal terminal according to claim 1, wherein a first through hole going through front and back surfaces of the electrode facing portion is formed at the middle point in each of the units.

3. A metal terminal connectable to terminal electrodes respectively formed on ends in a second axis direction of a plurality of chip components arranged side by side in a first axis direction, comprising units each associated with one of the chip components, each of the units comprising:
an electrode facing portion configured to face the terminal electrode of the associated chip component;
a pair comprised of an upper holding portion and a lower holding portion configured to hold the chip component in a third axis direction substantially perpendicular to the first and second axis directions;
a mount portion located at a lower side of the electrode facing portion and below the lower holding portion in the third axis direction; and
a first through hole going through front and back surfaces of the electrode facing portion disposed at a middle point between the upper holding portion and the lower holding portion in the third axis direction.

4. The metal terminal according to claim 1, each of the units further comprising:
a second through hole disposed on the electrode facing portion near the mount portion,
wherein the lower holding portion is bent from a lower edge in the third axis direction of the second through hole.

5. The metal terminal according to claim 3, each of the units further comprising:
a second through hole formed on the electrode facing portion closer to the mount portion than the first through hole,
wherein the lower holding portion is bent from a lower edge in the third axis direction of the second through hole.

6. The metal terminal according to claim 1, wherein the electrode facing portions of the units are continuously formed by a plate member in the first axis direction.

7. The metal terminal according to claim 3, wherein the electrode facing portions of the units are continuously formed by a plate member in the first axis direction.

8. An electronic device comprising the metal terminal according to claim 1.

9. An electronic device comprising the metal terminal according to claim 3.

10. An electronic device comprising:
a plurality of chip components arranged side by side in a first axis direction;
terminal electrodes respectively formed on ends in a second axis direction of the plurality of chip components; and
a metal terminal connected to the terminal electrodes, the metal terminal comprising units each associated with one of the chip components, each of the units comprising:
an electrode facing portion facing the terminal electrode of the associated chip component;
a pair comprised of an upper holding portion and a lower holding portion holding the chip component in a third axis direction substantially perpendicular to the first and second axis directions;
a mount portion located at a lower side of the electrode facing portion and below the lower holding portion in the third axis direction; and
protrusions protruding from the electrode facing portion toward the terminal electrode,
wherein a central part of the terminal electrode is positioned between the protrusions in the third axis direction in each of the units.

11. The metal terminal according to claim 10, wherein the central part of the terminal electrode in each of the units is positioned on a virtual center line in the first axis direction passing through a middle point between the upper holding portion and the lower holding portion in the third axis direction.

12. An electronic device comprising:
a plurality of chip components arranged side by side in a first axis direction;
terminal electrodes respectively formed on ends in a second axis direction of the plurality of chip components; and a metal terminal connected to the terminal electrodes, the metal terminal comprising units each associated with one of the chip components, each of the units comprising:
- an electrode facing portion facing the terminal electrode of the associated chip component;
- a pair comprised of an upper holding portion and a lower holding portion holding the chip component in a third axis direction substantially perpendicular to the first and second axis directions;
- a mount portion located at a lower side of the electrode facing portion and below the lower holding portion in the third axis direction; and
- a first through hole going through front and back surfaces of the electrode facing portion that is disposed between the upper holding portion and the lower holding portion, a central part of the terminal electrode being disposed within the first through hole.

13. An electronic device comprising:
a plurality of chip components arranged side by side in a first axis direction;
terminal electrodes respectively formed on ends in a second axis direction of the plurality of chip components; and
a metal terminal connected to the terminal electrodes, the metal terminal comprising units each associated with one of the chip components, each of the units comprising:
- an electrode facing portion facing the terminal electrode of the associated chip component;
- a pair comprised of an upper holding portion and a lower holding portion holding the chip component in a third axis direction substantially perpendicular to the first and second axis directions;
- a mount portion located at a lower side of the electrode facing portion and below the lower holding portion in the third axis direction;
- protrusions protruding from the electrode facing portion toward the terminal electrode;
- a joint region between the protrusions in the third axis direction;
- a connection member that joins the terminal electrode and the electrode facing portion in the joint region; and
- a non-joint region between a lower periphery of the joint region and the mount portion, where the connection member is not disposed between the terminal electrode and the electrode facing portion.

14. The electronic device according to claim 13, each of the units further comprising:
a second non-joint region between an upper periphery of the joint region and the upper holding portion, where the connection member is not disposed between the terminal electrode and the electrode facing portion.

15. An electronic device comprising:
a plurality of chip components arranged side by side in a first axis direction;
terminal electrodes respectively formed on ends in a second axis direction of the plurality of chip components; and
a metal terminal connected to the terminal electrodes, the metal terminal comprising units each associated with one of the chip components, each of the units comprising:
- an electrode facing portion facing the terminal electrode of the associated chip component;
- a pair comprised of an upper holding portion and a lower holding portion holding the chip component in a third axis direction substantially perpendicular to the first and second axis directions;
- a mount portion located below the lower holding portion of the electrode facing portion in the third axis direction;
- a first through hole going through front and back surfaces of the electrode facing portion;
- a joint region that surrounds the first through hole such that the first through hole is positioned in a central art of the joint region; and
- a connection member that joins the terminal electrode and the electrode facing portion in the joint region.

* * * * *